United States Patent
Tang et al.

(10) Patent No.: US 10,639,549 B2
(45) Date of Patent: May 5, 2020

(54) INFORMATION PROCESSING METHOD, TERMINAL, AND COMPUTER STORAGE MEDIUM

(71) Applicant: Tencent Technology (Shenzhen) Company Limited, Shenzhen (CN)

(72) Inventors: Yong Tang, Shenzhen (CN); Jianmiao Weng, Shenzhen (CN); Yu Chen, Shenzhen (CN); Wei Gong, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/725,140

(22) Filed: Oct. 4, 2017

(65) Prior Publication Data
US 2018/0028918 A1    Feb. 1, 2018

Related U.S. Application Data

(63) Continuation-in-part of application No. PCT/CN2016/081041, filed on May 4, 2016.

(30) Foreign Application Priority Data

Sep. 29, 2015    (CN) .......................... 2015 1 0633275

(51) Int. Cl.
*A63F 9/24*    (2006.01)
*A63F 13/58*    (2014.01)
(Continued)

(52) U.S. Cl.
CPC .......... *A63F 13/58* (2014.09); *A63F 13/2145* (2014.09); *A63F 13/533* (2014.09);
(Continued)

(58) Field of Classification Search
CPC .... A63F 13/58; A63F 13/5378; A63F 13/533; A63F 13/2145; A63F 2300/64;
(Continued)

(56) References Cited

U.S. PATENT DOCUMENTS 6,273,818 B1 * 8/2001 Komoto ................ A63F 13/005
463/31
8,210,943 B1 * 7/2012 Woodard ................ A63F 13/10
463/1
(Continued)

FOREIGN PATENT DOCUMENTS

CN    1743043 A    3/2006
CN    1794252 A    6/2006
(Continued)

OTHER PUBLICATIONS

You can click on champion portraits to use targeted abilities on them. boards.na.leagueoflegends.com. Online. 2014. Accessed via the Internet. Accessed Nov. 24, 2018. <URL: https://boards.na.leagueoflegends.com/en/c/GD/oPh9R75a-you-can-click-on-champion-portraits-to-use-targeted-abilities-on-them>.*

(Continued)

*Primary Examiner* — Dmitry Suhol
*Assistant Examiner* — Carl V Larsen
(74) *Attorney, Agent, or Firm* — Morgan, Lewis & Bockius LLP

(57) ABSTRACT

An information processing method, including: at a first gaming terminal that corresponds to a first game player in a game: displaying a first game scene from a first viewing perspective corresponding to the first game player; displaying, concurrently with the first game scene, a character selection area that is distinct from the first game scene, including displaying, within the character selection area, respective avatars corresponding a first subset of the plural- (Continued)

ity of game characters that are currently eligible targets of a first game operation associated with the first game player; detecting a selection input directed to at least a first avatar in the character selection area that corresponds to a first game character of the first subset of the plurality of game characters; and in response to detecting the selection input, selecting the first game character in the first game scene as a target of the first game operation.

15 Claims, 11 Drawing Sheets

(51) Int. Cl.
    *G06F 3/0484*     (2013.01)
    *A63F 13/5378*     (2014.01)
    *A63F 13/533*     (2014.01)
    *A63F 13/2145*     (2014.01)
    *G06F 3/0482*     (2013.01)

(52) U.S. Cl.
    CPC ........ *A63F 13/5378* (2014.09); *G06F 3/0482* (2013.01); *G06F 3/0484* (2013.01); *A63F 2300/308* (2013.01); *A63F 2300/64* (2013.01); *A63F 2300/65* (2013.01)

(58) Field of Classification Search
    CPC ........... A63F 2300/308; A63F 2300/65; G06F 3/0482; G06F 3/0484
    See application file for complete search history.

(56) References Cited

U.S. PATENT DOCUMENTS

| | | | |
|---|---|---|---|
| 2004/0248631 A1* | 12/2004 | Hirai | A63F 13/10 463/4 |
| 2010/0302138 A1 | 12/2010 | Poot et al. | |
| 2011/0245942 A1* | 10/2011 | Yamamoto | A63F 13/803 700/91 |
| 2012/0122561 A1 | 5/2012 | Hedrick et al. | |
| 2013/0005417 A1* | 1/2013 | Schmidt | A63F 13/213 463/5 |
| 2014/0113718 A1 | 4/2014 | Norman et al. | |

FOREIGN PATENT DOCUMENTS

| | | |
|---|---|---|
| CN | 103096134 A | 5/2013 |
| CN | 103157281 A | 6/2013 |
| CN | 104066488 A | 9/2014 |
| CN | 104618797 A | 5/2015 |
| CN | 2015064362 A1 | 5/2015 |
| CN | 104937641 A | 9/2015 |
| CN | 105335064 A | 2/2016 |
| EP | 1970106 A1 | 9/2008 |
| JP | 2012061024 A | 3/2012 |
| KR | 20080080650 A | 9/2008 |

OTHER PUBLICATIONS

HUD Update. na.leagueoflegensd.com. Online. Jun. 3, 2015. Accessed via the Internet. Accessed Nov. 24, 2018. <URL: https://web.archive.org/web/20150603204527/https://na.leagueoflegends.com/en/page/game-features/hud-update>.*

League of Legends Basics—The Minimap. Youtube.com. Online. Oct. 15, 2012. Accessed via the Internet. Accessed Nov. 24, 2018. <URL: https://www.youtube.com/watch?v=r0jFTkz4C5l>.*

Death. leagueoflegends.wikia.com. Online. Sep. 14, 2015. Accessed via the Internet. Accessed Nov. 24, 2018. <URL: https://web.archive.org/web/20150914221029/http://leagueoflegends.wikia.com/wiki/Death>.*

Sight. leagueoflegends.wikia.com. Online. Sep. 12, 2015. Accessed via the Internet. Accessed Nov. 24, 2018. <URL: https://web.archive.org/web/20150912194734/http://leagueoflegends.wikia.com/wiki/Sight>.*

League of Legends. en.wikipedia.org. Online. Sep. 9, 2014. Acessed via the Internet. Accessed Nov. 24, 2018. <URL: https://web.archive.org/web/20140909155629/https://en.wikipedia.org/wiki/League_of_Legends>.*

"Longest autoattack range?". forums.na.leagueoflegends.com. Online. Oct. 7, 2011. Accessed via the Internet. Accessed Dec. 11, 2018. <URL: http://forums.na.leagueoflegends.com/board/showthread.php?t=1332630>.*

Lulu. leagueoflegends.fandom.com. Online. Sep. 14, 2014. Accessed via the Internet. Accessed Mar. 28, 2019. <URL: https://leagueoflegends.fandom.com/wiki/Lulu?oldid=2129073> (Year: 2014).*

Monster Hunter Freedom User Manual. Capcom. 2005. Accessed via the Internet. Accessed Aug. 31, 2019. <URL: https://www.gamesdatabase.org/Media/SYSTEM/Sony_PSP//Manual/formated/Monster_Hunter_Freedom_-_Capcom_Co.,_Ltd..pdf> (Year: 2005).*

Head-up display. dota2.gamepedia.org. Online. Mar. 18, 2015. Accessed via the Internet. Accessed Aug. 31, 2019. <URL: https://web.archive.org/web/20150318012338/https://dota2.gamepedia.com/Head-up_display> (Year: 2015).*

Tencent Technology, ISR, PCT/CN2016/081041, Aug. 10, 2016, 2 pgs.

Tencent Technology, Written Opinion, PCT/CN2016/081041, Aug. 10, 2016, 7 pgs.

Tencent Technology, IPRP, PCT/CN2016/081041, Apr. 3, 2018, 8 pgs.

* cited by examiner

INFORMATION PROCESSING METHOD, TERMINAL, AND COMPUTER STORAGE MEDIUM

PRIORITY CLAIM AND RELATED APPLICATION

This application is a continuation-in-part application of PCT/CN2016/081041, entitled "INFORMATION PROCESSING METHOD, TERMINAL AND COMPUTER STORAGE MEDIUM" filed on May 4, 2016, which claims priority to Chinese Patent Application No. 201510633275.3, filed with the State Intellectual Property Office of the People's Republic of China on Sep. 29, 2015, and entitled "INFORMATION PROCESSING METHOD, TERMINAL AND COMPUTER STORAGE MEDIUM", both of which are incorporated herein by reference in their entirety.

FIELD OF THE TECHNOLOGY

The present disclosure relates to information processing technologies, and in particular, to an information processing method, a terminal, and a computer storage medium.

BACKGROUND OF THE DISCLOSURE

With rapid development of Internet technologies and gradual popularization of large-screen and super-screen intelligent terminals, a processor of an intelligent terminal has an increasingly high processing capability, so that many applications that implement control based on man-machine interaction appear on a large screen or a super screen. In a process of implementing control based on man-machine interaction, multiple users may run different interaction modes by creating groups in one-to-one, one-to-many, and many-to-many forms, to obtain different interaction results. For example, in a graphical user interface (GUI) obtained through rendering on a large screen or a super screen, after multiple users are grouped into two different groups, by means of control processing in man-machine interaction, information exchange may be performed between the different groups, and different interaction results are obtained according to a response to information exchange; and by means of control processing in man-machine interaction, information exchange may further be performed between group members in a same group, and different interaction results are obtained according to a response to information exchange.

SUMMARY

In the existing technology, in an information exchange process, because a target group member (e.g., enemy characters in a game) frequently moves, or because there are a large number of target group members and the target group members frequently move, when a target group member is selected (e.g., selected as a target for an attack by the game player controlled by the user), multiple times of trigger operations are required (e.g., the user has to tap multiple times to select each of the enemy characters within view and may sometimes miss due to movement of the enemy characters). A trigger operation process (e.g., selecting all the desired targets by tapping) has a relatively long time and has low accuracy, and requirements for rapidness and accuracy cannot be met in the information exchange process. In related technologies, there is still no effective solution to the problem currently.

Embodiments of the present technology expect to provide an information processing method, a terminal, and a computer storage medium, so as to rapidly and accurately select a target object (e.g., a target enemy character (or a target friend character) in the game for an attack or other game operation (e.g., healing)) in an information exchange process, thereby improving user experience.

To achieve the foregoing objective, the technical solutions in the embodiments of the present technology are implemented as follows:

An embodiment of the present technology provides an information processing method, a software application being executed on a processor of a terminal and rendering being performed on a display of the terminal, to obtain a GUI, the processor, the GUI, and the software application being implemented in a game system, and the method including:

performing rendering in the GUI, to obtain at least one virtual resource object, at least one of the virtual resource object being configured as a first character object that performs a first virtual operation according to an input first user command;

deploying in such a manner that at least one character container object in at least one character selection area in the GUI includes at least one window location; and detecting a second character object that is in the GUI and whose distance to the first character object meets a first preset condition, and performing, according to a first display parameter, rendering on a detected character operation object associated with the second character object in the at least one window location; and performing, by the first character object, at least one of the first virtual operation on a corresponding second character object when a selection operation gesture on at least one character operation object on which rendering is performed according to the first display parameter and that is in the character container object is detected.

An embodiment of the present technology further provides a terminal, the terminal including: a rendering processing unit, a deployment unit, a detection unit, and an operation execution unit, the rendering processing unit being configured to: execute a software application and perform rendering, to obtain a GUI; and perform rendering in the GUI, to obtain at least one virtual resource object, at least one of the virtual resource object being configured as a first character object that performs a first virtual operation according to an input first user command; and being further configured to perform, according to a first display parameter, rendering on a character operation object detected by the detection unit and associated with the second character object in the at least one window location;

the deployment unit being configured to: deploy in such a manner that at least one character container object in at least one character selection area in the GUI includes at least one window location;

the detection unit being configured to detect a second character object that is in the GUI and whose distance to the first character object meets a first preset condition; and the operation execution unit being configured to: perform, by the first character object, at least one of the first virtual operation on a corresponding second character object when a selection operation gesture on at least one character operation object on which rendering is performed according to the first display parameter and that is in the character container object is detected.

An embodiment of the present technology further provides a terminal, the terminal including: a processor and a display; the processor being configured to: execute a software application and perform rendering on the display, to obtain a GUI; and the processor, the GUI, and the software application being implemented on a game system; and the processor being further configured to perform rendering in the GUI, to obtain at least one virtual resource object, at least one of the virtual resource object being configured as a first character object that performs a first virtual operation according to an input first user command;

deploy in such a manner that at least one character container object in at least one character selection area in the GUI includes at least one window location;

detect a second character object that is in the GUI and whose distance to the first character object meets a first preset condition, and perform, according to a first display parameter, rendering on a detected character operation object associated with the second character object in the at least one window location; and perform, by the first character object, at least one of the first virtual operation on a corresponding second character object when detecting a selection operation gesture on at least one character operation object on which rendering is performed according to the first display parameter and that is in the character container object.

An embodiment of the present technology further provides a computer storage medium, a computer executable instruction being stored in the computer storage medium, and the computer executable instruction being configured to perform the information processing method in the embodiments of the present technology.

According to the information processing method, the terminal, and the computer storage medium in the embodiments of the present technology, by means of a window location in a character container object deployed in a character selection area in a GUI, rendering is performed, in a corresponding window location, on a character operation object associated with a second character object that performs information exchange with a first character object, and rendering is performed, according to a first display parameter, on a character operation object associated with a second character object whose distance to the first character object meets a first preset condition, that is, rendering is performed, according to the first display parameter, on a UI avatar associated with the second character object whose distance to the first character object meets a first preset condition, so that the UI avatar has a display effect that is different from that of another UI avatar, and when a user selects a target character operation object, it is convenient for the user to rapidly and accurately select a target character object based on the different display effect by means of a selection operation gesture on the character operation object, thereby greatly improving operation experience of the user in an interaction process.

DESCRIPTION OF EMBODIMENTS

The present disclosure is further described in detail below with reference to the accompanying drawings and specific embodiments.

Figure 1:
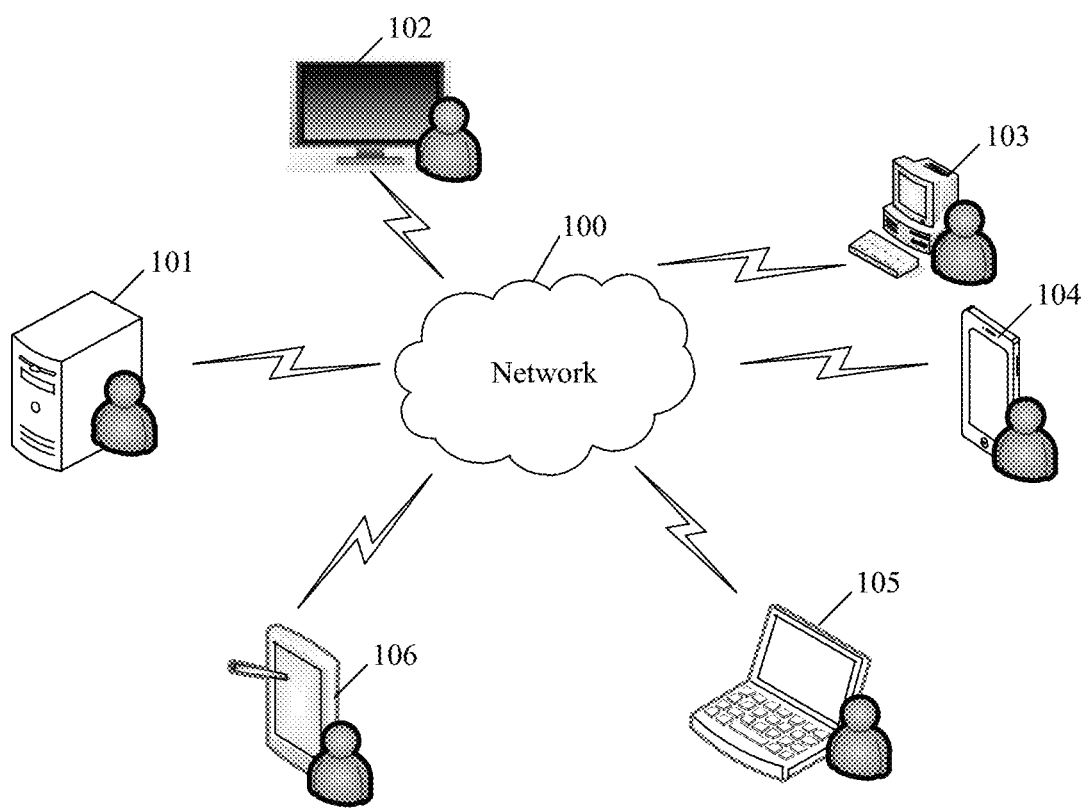
FIG. 1 is a schematic diagram of an application architecture of information exchange in an information processing method according to some embodiments of the present technology.

FIG. 1 is a schematic diagram of an application architecture of information exchange in an information processing method according to an embodiment of the present technology. As shown in FIG. 1, the application architecture includes: a server 101 (e.g., game server of an online multiplayer game) and at least one terminal (e.g., gaming terminals controlled by players). As shown in the application architecture, the terminal includes: a terminal 102, a terminal 103, a terminal 104, a terminal 105, and a terminal 106. The at least one terminal may establish a connection to the server 101 by using a network 100 (such as a wired network or a wireless network). Specifically, the terminal includes a mobile phone, a desktop computer, a PC, an all-in-one PC, and other types.

In this embodiment, a processor of the terminal can execute a software application and perform rendering on a display of the terminal, to obtain a GUI (e.g., a game user interface, including display of a game scene (e.g., representing a viewing perspective of a respective game player, such as a first person view or a bird's eye view, or a "God's view" from above, etc.), and various game control affordances, status indicators, etc.). The processor, the GUI, and the software application are implemented on a game system. In this embodiment, in a process of implementing the processor, the GUI, and the software application in the game system, the at least one terminal may perform information exchange with the server 101 by using a wired network or a wireless network, to implement a one-to-one or many-to-many (such as three-to-three or five-to-five) application mode scenario in the game system. In the one-to-one application scenario, a virtual resource object (e.g., a game character) in a graphical user object (e.g., a game window showing the game scene) obtained through rendering by a terminal may perform information exchange with a virtual resource object (e.g., another game character) preset in the game system (which may be understood as man vs machine), that is, the terminal performs information exchange with the server. Alternatively, in the one-to-one application scenario, a virtual resource object in a graphical user object obtained through rendering by a terminal may perform information exchange with a virtual resource object in a graphical user object obtained through rendering by another terminal, for example, a virtual resource object in a graphical user object obtained through rendering by the terminal 102 performs information exchange with a virtual resource object in a graphical user object obtained through rendering by the terminal 103. In the many-to-many application mode scenario, using the three-to-three application mode scenario as an example, virtual resource objects (e.g., game characters controlled respectively by different users or game players) in graphical user objects (e.g., game windows displayed at different gaming terminals of the different users) that are obtained through rendering respectively performed by a terminal 1, a terminal 2, and a terminal 3 (e.g., the different gaming terminals controlled by the different users) are grouped into a first group (e.g., a game team on the same side of the battle), virtual resource objects in graphical user objects that are obtained through rendering respectively performed by a terminal 4, a terminal 5, and a terminal 6 are grouped into a second group (e.g., an opposing game team of the first group), and a group member in the first group performs information exchange with a group member in the second group. In some embodiments, the information exchange (e.g., exchange of viewing perspective of the game space as rendered on the different players' terminals or enemy resource or status information for enemies within each other's fields of view, etc.) occur between team members of the same group. In some embodiments, the information exchange occur between members of different game teams.

The example in FIG. 1 is only an example of an application architecture for implementing the embodiments of the present technology, and the embodiments of the present technology are not limited to the application architecture in FIG. 1. Based on the application architecture, various embodiments of the present technology are provided.

Figure 2:
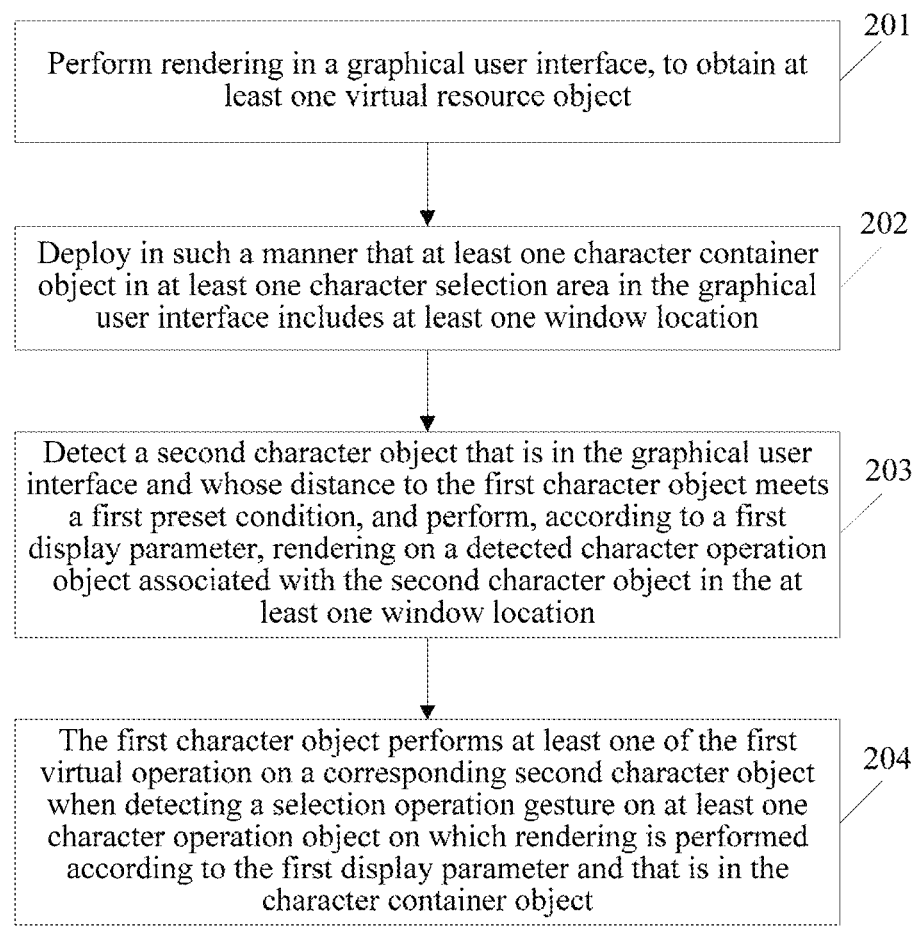
FIG. 2 is a schematic flowchart of an information processing method according to some embodiments of the present technology.

This embodiment of the present technology provides an information processing method. FIG. 2 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 2, the method includes the following operations:

Operation 201: Perform rendering in the GUI, to obtain at least one virtual resource object (e.g., a game character controlled by the game player at the current terminal), at least one of the virtual resource object being configured as a first character object (e.g., a game character) that performs a first virtual operation (e.g., a game action) according to an input first user command (e.g., a user interface operation performed by the user operating at the terminal, such as a button press, a gesture, that is used to trigger a game action on the part of the game character controlled by the user, etc.). For example, the GUI includes a game window that shows at least a portion of the game world that includes the game character controlled by the user, and possibly other game characters or objects that are in the vicinity of the game character controlled by the user. In some embodiments, as conventionally done, the user may pan the game window to see other portions of the game world, such as portions that include the game characters controlled by other team members of the user. In addition, as conventionally done, the user may tap on the game characters that are displayed in the game scene to select the characters as the target(s) for a subsequent game operation (e.g., release of a skill or attack on the selected target characters). The characters in the game scene move or perform operations in accordance with the game program design and the actions of the players that are controlling the game characters.

Operation 202: Deploy in such a manner that at least one character container object (e.g., a pop-up window or floating window, or a call-out bubble, etc.) in at least one character selection area (e.g., an area of the game interface that shows a listing of the avatars that corresponds to the team members of the user and/or one or more listing(s) of the avatars that correspond to the team members of the opposing team(s), or a listing of enemy characters that are within the field of view or attack range of the game character controlled by the user of the first terminal) in the GUI includes at least one window location (e.g., in a window outside of the game scene or to the side of the game scene display window) (e.g., a location that is at an upper corner of the game UI, overlaid on the game scene normally shown to the user, or next to the game scene normally shown to the user).

Operation 203: Detect a second character object (e.g., an enemy character) that is in the GUI (e.g., within the game scene from the viewing perspective of the game player at the current terminal) and whose distance to the first character object meets a first preset condition (e.g., the enemy character is within a predefined effect range (e.g., attack range, skill application range, etc.) of the game character controlled by the user at the current terminal), and perform, according to a first display parameter (e.g., a predefined visual indication, such as colored highlighting, or enlargement, etc.), rendering on a detected character operation object (e.g., avatar of the second character object that is displayed in the character selection area) associated with the second character object in the at least one window location. In other words, in an example, the enemy characters that are within the predefined attack range of the game character controlled by the user at the current terminal have corresponding avatars displayed in a character selection region of the game user interface that is distinct and separately rendered from the game scene, and the avatars corresponding to those enemy characters within attack range are visually highlighted relative to other avatars also listed in the character selection region (e.g., enemy characters that are in the scene, but outside of the attack range, or are immune to the currently selected attack type of the game character controlled by the user at the current terminal). In some embodiments, the enemy characters that are not within attack range, or are immune to the attack (e.g., ineligible targets are grayed out, and not selectable by tapping).

Operation 204: The first character object (e.g., game character controlled by the user at the current terminal) performs at least one of the first virtual operation (e.g., release an attack or skill) on a corresponding second character object (e.g., the enemy game character that correspond to the selected avatars in the character selection region) when detecting a selection operation gesture on at least one character operation object on which rendering is performed according to the first display parameter and that is in the character container object (e.g., avatars that are highlighted in the character selection region).

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the second character object associated with the character operation object and the first character object belong to different groups. A manner of rendering on the character container object in the character selection area includes, but is not limited to: a bar shape or an annular shape, that is, the character container object may be represented by using a character selection bar object or a character selection wheel object.

Figure 3:
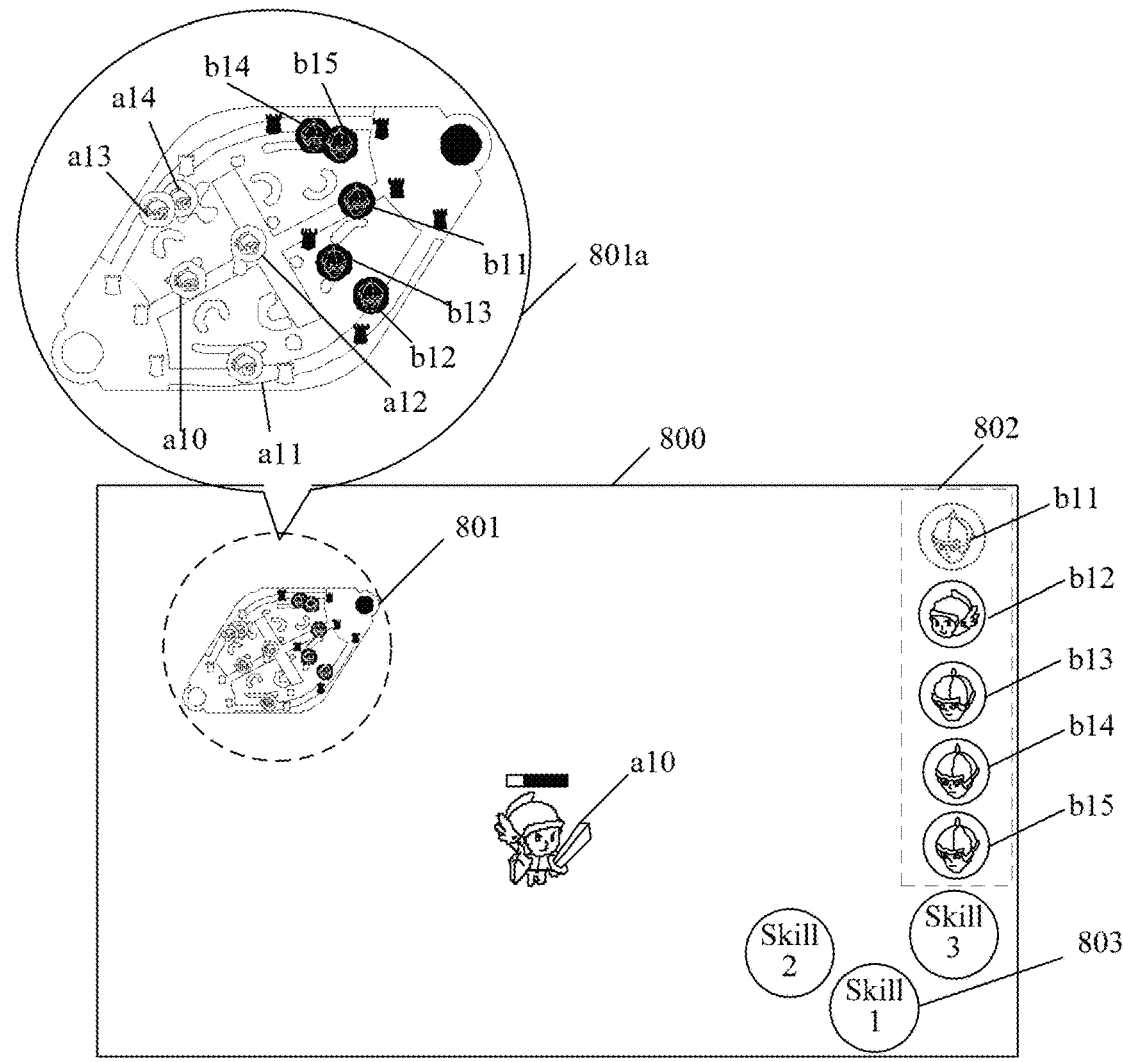
FIG. 3 is a first schematic diagram of a GUI in an information processing method according to some embodiments of the present technology.

FIG. 3 is a first schematic diagram of the GUI in the information processing method according to this embodiment of the present technology. As shown in FIG. 3, the GUI obtained through rendering on the display of the terminal includes the at least one virtual resource object. The virtual resource object includes at least one first character object a10. A user of the terminal may perform information exchange by using the GUI, that is, input a user command. The first character object a10 can perform a first virtual operation based on a first user command detected by the terminal, where the first virtual operation includes, but is not limited to: a moving operation, a physical attack operation, a skill attack operation, and the like. It may be understood that, the first character object a10 is a character object controlled by the user of the terminal. In the game system, the first character object a10 can perform a corresponding action in the GUI based on an operation of the user. In an implementation, the GUI further includes a mini map 801 of a virtual area in which the user character object is located. A schematic detailed method drawing of the mini map 801 is shown by 801a. As can be learned, a location of each character object (including a friend that belongs to a first group with the first character object a10 and enemy that belongs to a second group) in the virtual area is identified in the mini map 801. The GUI further includes at least one skill object 803, and the user may control, by means of a skill release operation, the user character object to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that interacts with the first character object. An example in which the character operation object is represented by using an avatar is used, that is, the character selection area 802 includes at least one avatar. The at least one avatar is respectively in a one-to-one correspondence with at least one second character object that interacts with the first character object. As shown in FIG. 3, a five-to-five application scenario is used in this example. There are five second character objects that belong to a group different from that of the first character object a10, and correspondingly, there are five character operation objects in the character selection area 802, for example, a character operation object b11, a character operation object b12, a character operation object b13, a character operation object b14, and a character operation object b15 shown in FIG. 3. It may be understood that, the five character operation objects in the character selection area 802 are in a one-to-one correspondence with the five second character objects that belong to groups different from that of the first character object.

Based on the example of the GUI shown in FIG. 3, during control by the user of the terminal, a location of the first character object changes in real time, and correspondingly, a location of the second character object in the GUI changes in real time. Therefore, in a process in which the first character object performs a virtual operation on the second character object, it is not easy for the user of the terminal to select a character object on which a virtual operation is to be performed. On this basis, in this embodiment, the second character object that is in the GUI and whose distance to the first character object meets the first preset condition is detected.

Specifically, the detecting a second character object that is in the GUI and whose distance to the first character object meets a first preset condition includes: detecting a second character object that is in the GUI and whose distance to the first character object is less than a first preset threshold.

Figure 4:
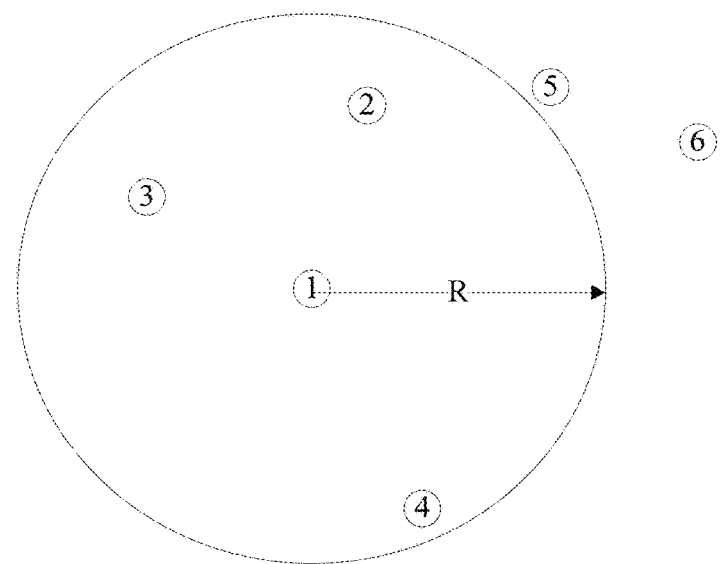
FIG. 4 is a schematic diagram of a principle of detecting a second character object (e.g., an enemy game character) whose distance to a first character object (e.g., game character controlled by the user) meets a first preset condition (e.g., is within a predefined distance from the game character controlled by the user) in an information processing method according to some embodiments of the present technology.

FIG. 4 is a schematic diagram of a principle of detecting the second character object whose distance to the first character object meets the first preset condition in the information processing method according to this embodiment of the present technology. As shown in FIG. 4, a circular area using the first character object 1 as a circle center and using the first preset threshold (R) as a radius is detected, to obtain an area range of the circular area, where the area range may be represented by using a coordinate range. That is, an XY coordinate system is established in virtual space in which the first character object and the second character object are located, and a coordinate range of the circular area in the XY coordinate system is obtained. Further, a coordinate of a second character object in the GUI is detected in real time, it is determined whether the detected coordinate is within the coordinate range representing the circular area, and when it is determined that there is a coordinate within the coordinate range representing the circular area (for example, a second character object 2, a second character object 3, and a second character object 4 shown in FIG. 4 are all in the circular area), a second character object that is in the GUI and whose distance to the first character object is less than the first preset threshold is detected. The first preset threshold meets an attack distance or a skill release distance of the first character object, so that in a subsequent operation process, it is convenient to rapidly select the second character object and it is convenient for the first character object to perform a virtual operation on the second character object.

Figure 5:
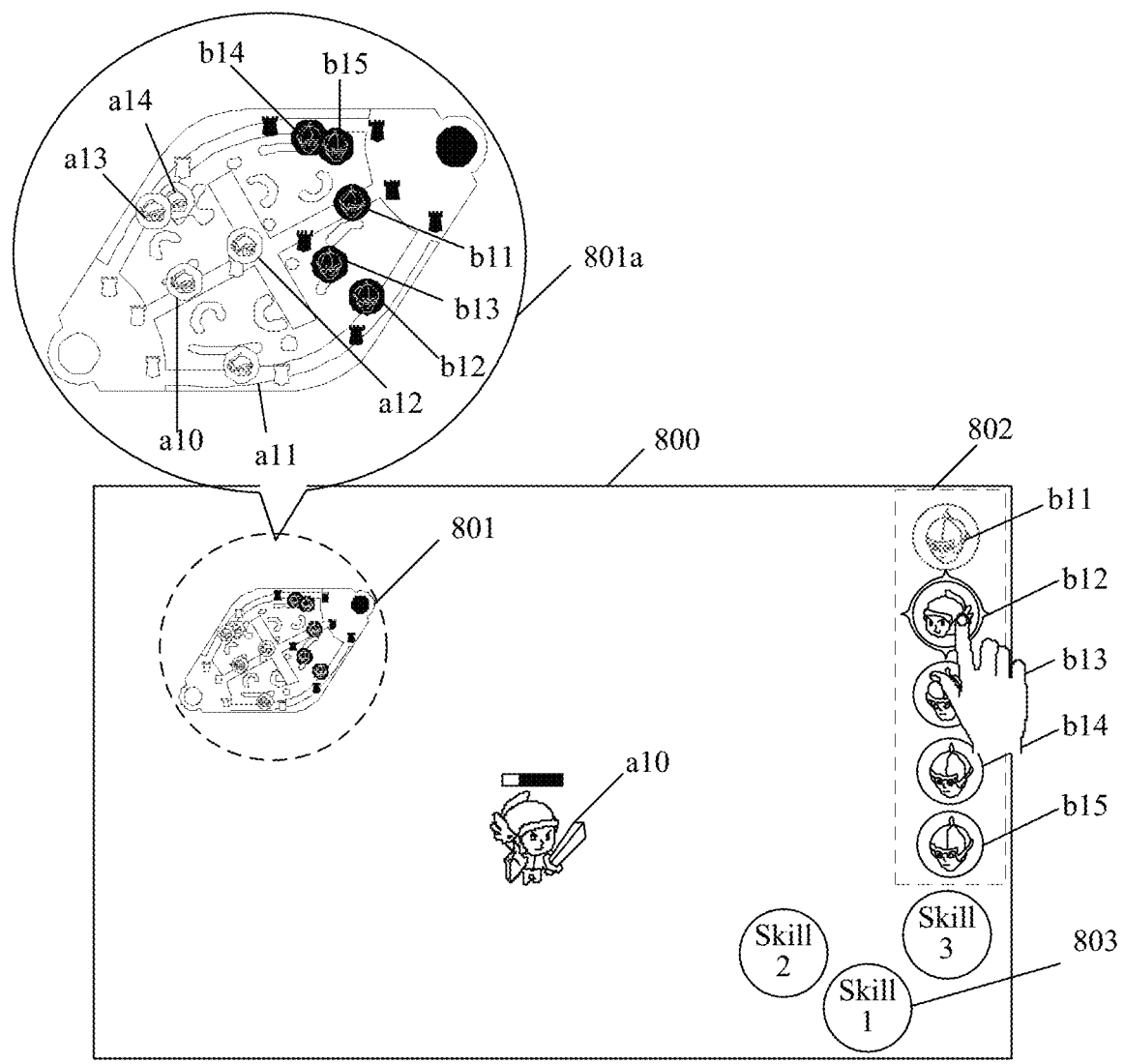
FIG. 5 is a second schematic diagram of a GUI in an information processing method according to some embodiments of the present technology.

After the second character object that is in the GUI and whose distance to the first character object meets the first preset condition is detected, a corresponding character operation object in the character container object associated with the second character object is determined, and rendering is performed on the character operation object in a corresponding window location according to the first display parameter. FIG. 5 is a second schematic diagram of the GUI in the information processing method according to this embodiment of the present technology. As shown in FIG. 5, rendering is performed, according to the first display parameter, on the character operation object associated with the second character object that meets the first preset condition (referring to the character operation object b12 shown in FIG. 5, an edge of an outer circle of the character operation object b12 has a rendering effect different from that of another character operation object, so that the character operation object b12 has a highlighted display effect). Compared with another character operation object, the character operation object (such as the character operation object b12) on which rendering is performed by using the first display parameter has an obvious distinguishing feature, so that the user of terminal can immediately identify the character operation object, and the user of the terminal can rapidly select the character operation object having an obvious distinguishing feature in a subsequent operation.

In this embodiment, for at least one character operation object that is in a character bar selection object in the GUI and on which rendering is performed according to the first display parameter, when the user of the terminal performs a trigger operation on the at least one character operation object, that is, when the terminal detects a selection operation gesture on the at least one character operation object, it indicates that a second character object associated with the character operation object is selected, and further, the first character object performs the first virtual operation on the second character object. Specifically, in the game system, the first virtual operation may be a physical attack operation or may be a skill release operation. When the first virtual operation is a physical attack operation, after the character operation object associated with the second character object is selected, the first character object directly performs the physical attack operation on the second character object. When a skill release operation is to performed, a skill object first needs to be selected by means of a skill selection operation gesture, and after the character operation object associated with the second character object is selected, the first character object performs, the skill release operation on the skill object, on the second character object.

By means of the technical solution in this embodiment of the present technology, by means of a window location in a character container object deployed in a character selection area in a GUI, rendering is performed, in a corresponding window location, on a character operation object associated with a second character object that performs information exchange with a first character object, and rendering is performed, according to a first display parameter, on a character operation object associated with a second character object whose distance to the first character object meets a first preset condition, that is, rendering is performed, according to the first display parameter, on a UI avatar associated with the second character object whose distance to the first character object meets a first preset condition, so that the UI avatar has a display effect that is different from that of another UI avatar, and when a user selects a target character operation object, it is convenient for the user to rapidly and accurately select a target character object based on the different display effect by means of a selection operation gesture on the character operation object, thereby greatly improving operation experience of the user in an interaction process.

Figure 6:
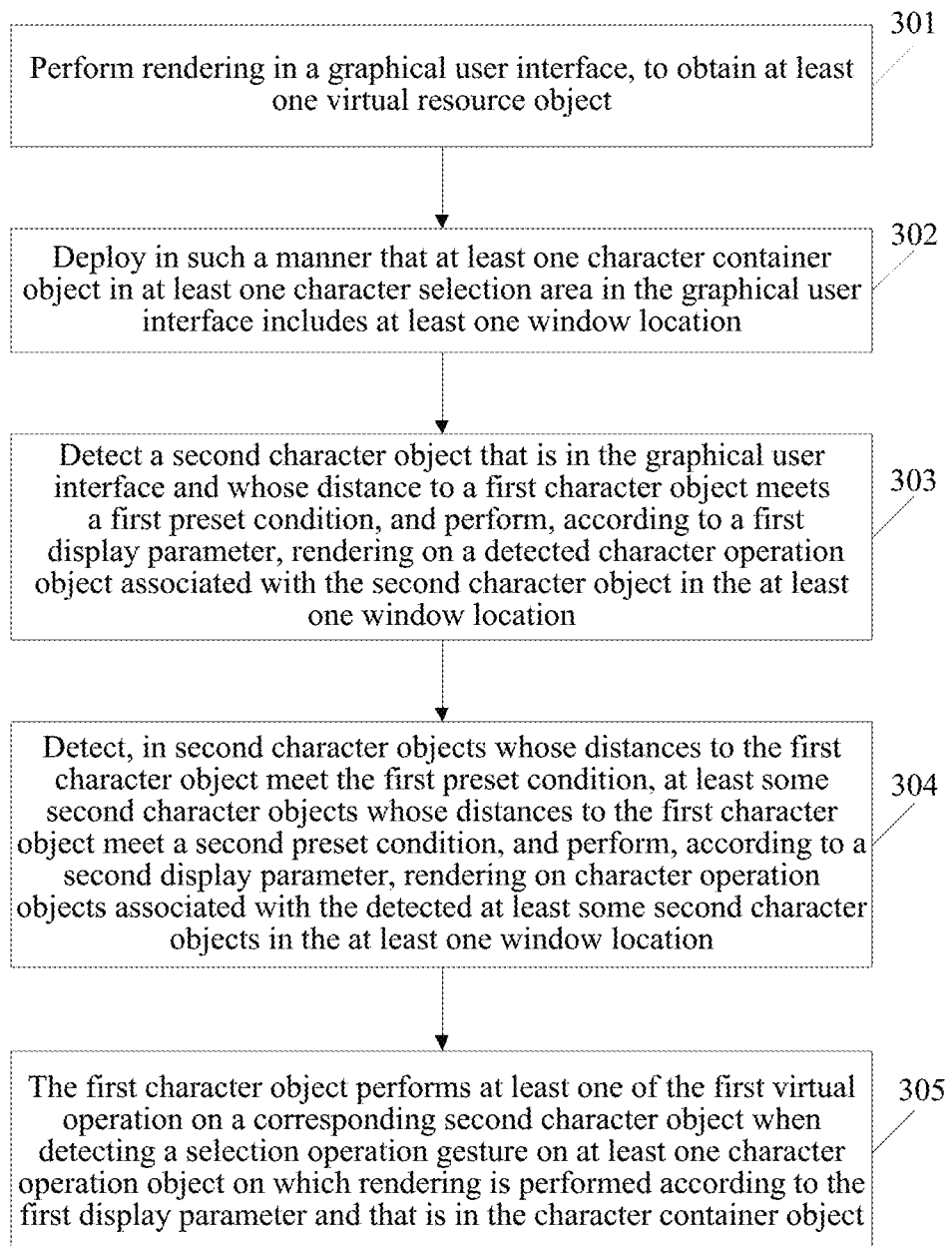
FIG. 6 is a schematic flowchart of an information processing method according to some embodiments of the present technology.

FIG. 6 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 6, the method includes the following operations:

Operation 301: Perform rendering in the GUI, to obtain at least one virtual resource object, at least one of the virtual resource object being configured as a first character object that performs a first virtual operation according to an input first user command.

Operation 302: Deploy in such a manner that at least one character container object in at least one character selection area in the GUI includes at least one window location.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the second character object associated with the character operation object and the first character object belong to different groups. A manner of rendering on the character container object in the character selection area includes, but is not limited to: a bar shape or an annular shape, that is, the character container object may be represented by using a character selection bar object or a character selection wheel object.

Specifically, referring to FIG. 3, the GUI obtained through rendering on the display of the terminal includes the at least one virtual resource object. The virtual resource object includes at least one first character object a10. A user of the terminal may perform information exchange by using the GUI, that is, input a user command. The first character object a10 can perform a first virtual operation based on a first user command detected by the terminal, where the first virtual operation includes, but is not limited to: a moving operation, a physical attack operation, a skill attack operation, and the like. It may be understood that, the first character object a10 is a character object controlled by the user of the terminal. In the game system, the first character object a10 can perform a corresponding action in the GUI based on an operation of the user. In an implementation, the GUI further includes a mini map 801 of a virtual area in which the user character object is located. A schematic detailed method drawing of the mini map 801 is shown by 801a. As can be learned, a location of each character object (including a friend that belongs to a first group with the first character object a10 and enemy that belongs to a second group) in the virtual area is identified in the mini map 801. The GUI further includes at least one skill object 803, and the user may control, by means of a skill release operation, the user character object to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that interacts with the first character object. An example in which the character operation object is represented by using an avatar is used, that is, the character selection area 802 includes at least one avatar. The at least one avatar is respectively in a one-to-one correspondence with at least one second character object that interacts with the first character object. As shown in FIG. 3, a five-to-five application scenario is used in this example. There are five second character objects that belong to a group different from that of the first character object a10, and correspondingly, there are five character operation objects in the character selection area 802, for example, a character operation object b11, a character operation object b12, a character operation object b13, a character operation object b14, and a character operation object b15 shown in FIG. 3. It may be understood that, the five character operation objects in the character selection area 802 are in a one-to-one correspondence with the five second character objects that belong to groups different from that of the first character object.

Based on the example of the GUI shown in FIG. 3, during control by the user of the terminal, a location of the first character object changes in real time, and correspondingly, a location of the second character object in the GUI changes in real time. On this basis, in a process in which the first character object performs a virtual operation on the second character object, it is not easy for the user of the terminal to select a character object on which a virtual operation is to be performed. On this basis, in this embodiment, the second character object that is in the GUI and whose distance to the first character object meets the first preset condition is detected.

Operation 303: Detect a second character object that is in the GUI and whose distance to the first character object meets a first preset condition, and perform, according to a first display parameter, rendering on a detected character operation object associated with the second character object in the at least one window location.

Herein, the detecting a second character object that is in the GUI and whose distance to the first character object meets a first preset condition includes: detecting a second character object that is in the GUI and whose distance to the first character object is less than a first preset threshold. Referring to FIG. 4, a circular area using the first character object 1 as a circle center and using the first preset threshold (R) as a radius is detected, to obtain an area range of the circular area, where the area range may be represented by using a coordinate range. That is, an XY coordinate system is established in virtual space in which the first character object and the second character object are located, and a coordinate range of the circular area in the XY coordinate system is obtained. Further, a coordinate of a second character object in the GUI is detected in real time, it is determined whether the detected coordinate is within the coordinate range representing the circular area, and when it is determined that there is a coordinate within the coordinate range representing the circular area (for example, a second character object 2, a second character object 3, and a second character object 4 shown in FIG. 4 are all in the circular area), a second character object that is in the GUI and whose distance to the first character object is less than the first preset threshold is detected. The first preset threshold meets an attack distance or a skill release distance of the first character object, so that in a subsequent operation process, it is convenient to rapidly select the second character object and it is convenient for the first character object to perform a virtual operation on the second character object.

Operation 304: Detect, in second character objects whose distances to the first character object meet the first preset condition, at least some second character objects whose distances to the first character object meet a second preset condition, and perform, according to a second display parameter, rendering on character operation objects associated with the detected at least some second character objects in the at least one window location.

Herein, the detecting, in second character objects whose distances to the first character object meet the first preset condition, at least some second character objects whose distances to the first character object meet a second preset condition includes:

detecting, in the second character objects whose distances to the first character object meet the first preset condition, a second character object whose distance to the first character object reaches a second preset threshold, where the second preset threshold is greater than or equal to the first preset threshold.

Figure 7:
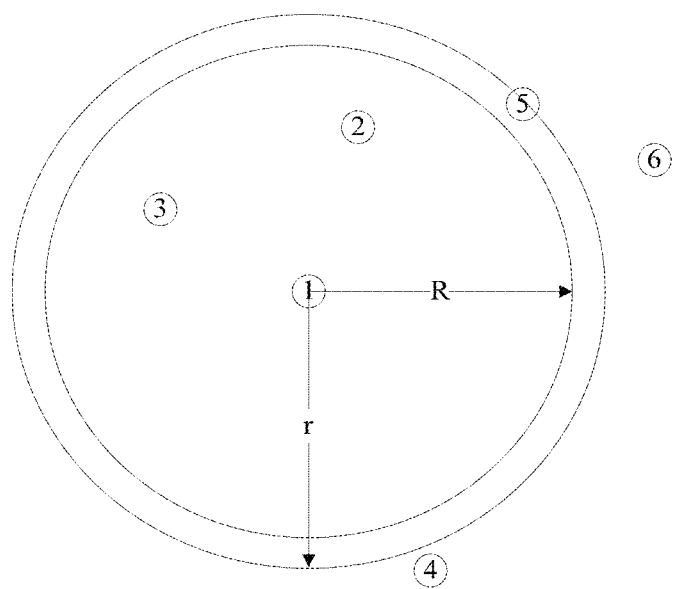
FIG. 7 is a schematic diagram of a principle of detecting a second character object whose distance to a first character object meets a second preset condition in an information processing method according to some embodiments of the present technology.

FIG. 7 is a schematic diagram of a principle of detecting the second character object whose distance to the first character object meets the second preset condition in the information processing method according to this embodiment of the present technology. Referring to FIG. 4 and FIG. 7, for the second character objects whose distances to the first character object meet the first preset condition (for example, the second character object 2, the second character object 3, and the second character object 4 shown in FIG. 4 all meet the first preset condition), that is, second character objects whose previous coordinate values are in the circular area using the first preset threshold (R) as a radius, because a location of the second character object in the GUI changes in real time, on this basis, before operation 305, that is, before a selection operation gesture on at least one character operation object on which rendering is performed according to the first display parameter and that is in the character container object is detected, the coordinate value of the second character object whose previous coordinate value is in the circular area using the first preset threshold (R) as a radius is detected in real time, and it is determined whether the coordinate value is in a circular area using the second preset threshold (r shown in FIG. 7) as a radius and using the first character object as a circle center. In the example shown in FIG. 7, the second preset threshold (r) is greater than the first preset threshold (R), that is, in the second character objects whose previous coordinate values are in the circular area using the first preset threshold as a radius, as the first character object and the second character objects move in real time, at least some second character objects move to make distances between at least some second character objects and the first character object be greater than the first preset threshold (R) and reach the second preset threshold (r), for example, the second character object 4 shown in FIG. 7. Further, an operation state in which character operation objects associated with the at least some second character objects can be selected is deactivated, and rendering is performed on the character operation object in the corresponding window location according to the second display parameter. In an implementation, the second display parameter may be a conventional display parameter, that is, in the GUI, rendering is performed, according to the second display parameter, on all other virtual resource objects than the character operation object that is displayed according to the first display parameter.

Operation 305: The first character object performs at least one of the first virtual operation on a corresponding second character object when detecting a selection operation gesture on at least one character operation object on which rendering is performed according to the first display parameter and that is in the character container object.

Herein, after the second character object that is in the GUI and whose distance to the first character object meets the first preset condition is detected, a corresponding character operation object in the character container object associated with the second character object is determined, and rendering is performed on the character operation object in a corresponding window location according to the first display parameter. Referring to FIG. 5, rendering is performed, according to the first display parameter, on the character operation object associated with the second character object that meets the first preset condition (referring to the character operation object b12 shown in FIG. 5, an edge of an outer circle of the character operation object b12 has a rendering effect different from that of another character operation object, so that the character operation object b12 has a highlighted display effect). Compared with another character operation object, the character operation object (such as the character operation object b12) on which rendering is performed by using the first display parameter has an obvious distinguishing feature, so that the user of terminal can immediately identify the character operation object, and the user of the terminal can rapidly select the character operation object having an obvious distinguishing feature in a subsequent operation.

In this embodiment, for at least one character operation object that is in a character bar selection object in the GUI and on which rendering is performed according to the first display parameter, when the user of the terminal performs a trigger operation on the at least one character operation object, that is, when the terminal detects a selection operation gesture on the at least one character operation object, it indicates that a second character object associated with the character operation object is selected, and further, the first character object performs the first virtual operation on the second character object. Specifically, in the game system, the first virtual operation may be a physical attack operation or may be a skill release operation. When the first virtual operation is a physical attack operation, after the character operation object associated with the second character object is selected, the first character object directly performs the physical attack operation on the second character object. When a skill release operation is to performed, a skill object first needs to be selected by means of a skill selection operation gesture, and after the character operation object associated with the second character object is selected, the first character object performs, the skill release operation on the skill object, on the second character object.

By means of the technical solution in this embodiment of the present technology, by means of a window location in a character container object deployed in a character selection area in a GUI, rendering is performed, in a corresponding window location, on a character operation object associated with a second character object that performs information exchange with a first character object, and rendering is performed, according to a first display parameter, on a character operation object associated with a second character object whose distance to the first character object meets a first preset condition, that is, rendering is performed, according to the first display parameter, on a UI avatar associated with the second character object whose distance to the first character object meets a first preset condition, so that the UI avatar has a display effect that is different from that of another UI avatar, and when a user selects a target character operation object, it is convenient for the user to rapidly and accurately select a target character object based on the different display effect by means of a selection operation gesture on the character operation object, thereby greatly improving operation experience of the user in an interaction process.

Figure 8:
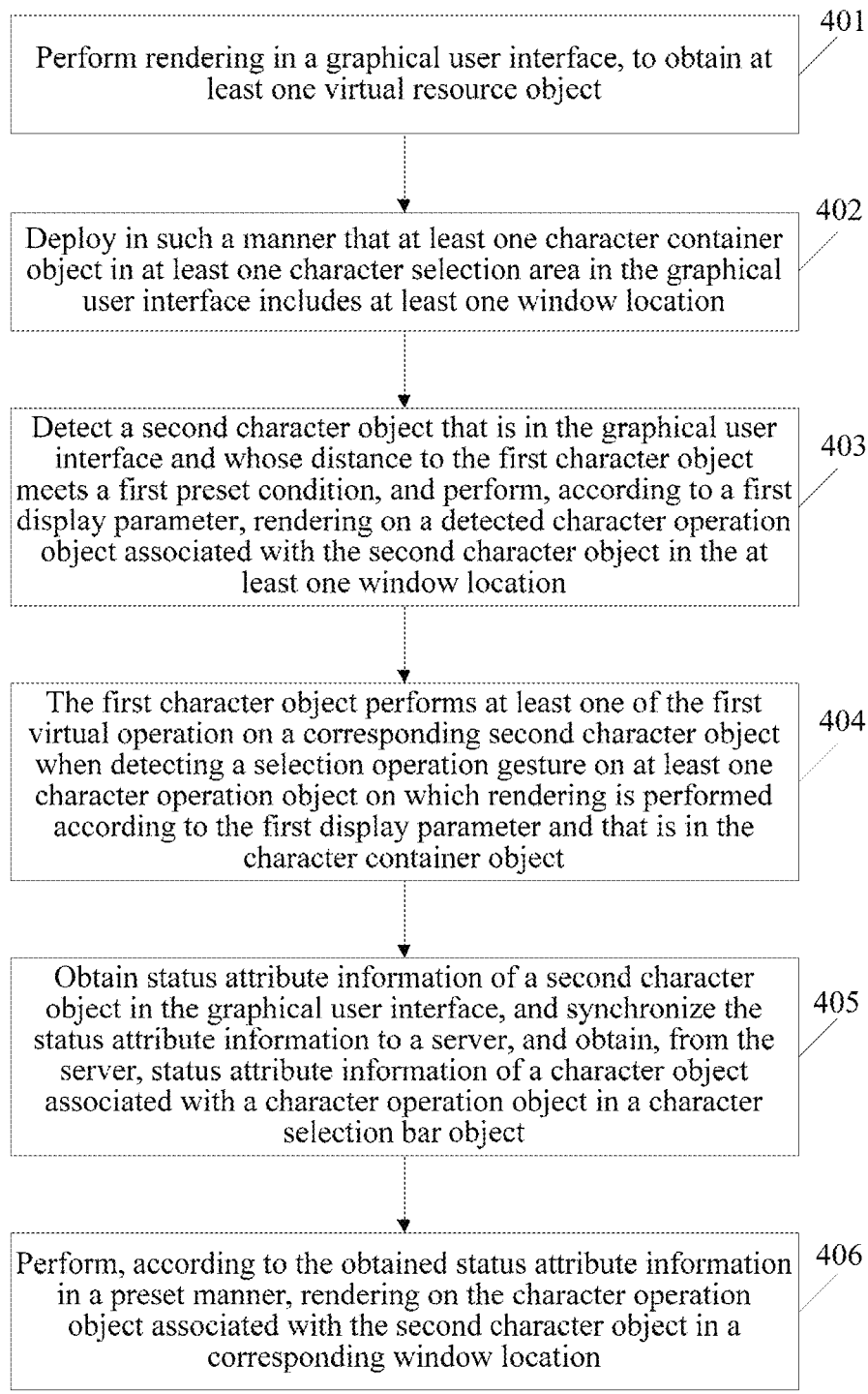
FIG. 8 is a schematic flowchart of an information processing method according to some embodiments of the present technology.

FIG. 8 is a schematic flowchart of the information processing method according to some embodiments of the present technology. The information processing method is applied to a terminal. A software application is executed on a processor of the terminal and rendering is performed on a display of the terminal, to obtain a GUI. The processor, the GUI, and the software application are implemented in a game system. As shown in FIG. 8, the method includes the following operations:

Operation 401: Perform rendering in the GUI, to obtain at least one virtual resource object, at least one of the virtual resource object being configured as a first character object that performs a first virtual operation according to an input first user command.

Operation 402: Deploy in such a manner that at least one character container object in at least one character selection area in the GUI includes at least one window location.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the second character object associated with the character operation object and the first character object belong to different groups. A manner of rendering on the character container object in the character selection area includes, but is not limited to: a bar shape or an annular shape, that is, the character container object may be represented by using a character selection bar object or a character selection wheel object.

Specifically, referring to FIG. 3, the GUI obtained through rendering on the display of the terminal includes the at least one virtual resource object. The virtual resource object includes at least one first character object a10. A user of the terminal may perform information exchange by using the GUI, that is, input a user command. The first character object a10 can perform a first virtual operation based on a first user command detected by the terminal, where the first virtual operation includes, but is not limited to: a moving operation, a physical attack operation, a skill attack operation, and the like. It may be understood that, the first character object a10 is a character object controlled by the user of the terminal. In the game system, the first character object a10 can perform a corresponding action in the GUI based on an operation of the user. In an implementation, the GUI further includes a mini map 801 of a virtual area in which the user character object is located. A schematic detailed method drawing of the mini map 801 is shown by 801a. As can be learned, a location of each character object (including a friend that belongs to a first group with the first character object a10 and enemy that belongs to a second group) in the virtual area is identified in the mini map 801. The GUI further includes at least one skill object 803, and the user may control, by means of a skill release operation, the user character object to perform a corresponding skill release operation.

In the example shown in FIG. 3, the GUI includes a character selection area 802, and a character container object is deployed in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that interacts with the first character object. An example in which the character operation object is represented by using an avatar is used, that is, the character selection area 802 includes at least one avatar. The at least one avatar is respectively in a one-to-one correspondence with at least one second character object that interacts with the first character object. As shown in FIG. 3, a five-to-five application scenario is used in this example. There are five second character objects that belong to a group different from that of the first character object a10, and correspondingly, there are five character operation objects in the character selection area 802, for example, a character operation object b11, a character operation object b12, a character operation object b13, a character operation object b14, and a character operation object b15 shown in FIG. 3. It may be understood that, the five character operation objects in the character selection area 802 are in a one-to-one correspondence with the second character objects that belong to groups different from that of the first character object.

Based on the example of the GUI shown in FIG. 3, during control by the user of the terminal, a location of the first character object changes in real time, and correspondingly, a location of the second character object in the GUI changes in real time. On this basis, in a process in which the first character object performs a virtual operation on the second character object, it is not easy for the user of the terminal to select a character object on which a virtual operation is to be performed. On this basis, in this embodiment, the second character object that is in the GUI and whose distance to the first character object meets the first preset condition is detected.

Operation 403: Detect a second character object that is in the GUI and whose distance to the first character object meets a first preset condition, and perform, according to a first display parameter, rendering on a detected character operation object associated with the second character object in the at least one window location.

Herein, the detecting a second character object that is in the GUI and whose distance to the first character object meets a first preset condition includes: detecting a second character object that is in the GUI and whose distance to the first character object is less than a first preset threshold. Referring to FIG. 4, a circular area using the first character object 1 as a circle center and using the first preset threshold (R) as a radius is detected, to obtain an area range of the circular area, where the area range may be represented by using a coordinate range. That is, an XY coordinate system is established in virtual space in which the first character object and the second character object are located, and a coordinate range of the circular area in the XY coordinate system is obtained. Further, a coordinate of a second character object in the GUI is detected in real time, it is determined whether the detected coordinate is within the coordinate range representing the circular area, and when it is determined that there is a coordinate within the coordinate range representing the circular area (for example, a second character object 2, a second character object 3, and a second character object 4 shown in FIG. 4 are all in the circular area), a second character object that is in the GUI and whose distance to the first character object is less than the first preset threshold is detected. The first preset threshold meets an attack distance or a skill release distance of the first character object, so that in a subsequent operation process, it is convenient to rapidly select the second character object and it is convenient for the first character object to perform a virtual operation on the second character object.

Operation 404: The first character object performs at least one of the first virtual operation on a corresponding second character object when a selection operation gesture on at least one character operation object on which rendering is performed according to the first display parameter and that is in the character container object is detected.

Herein, after the second character object that is in the GUI and whose distance to the first character object meets the first preset condition is detected, a corresponding character operation object in the character container object associated with the second character object is determined, and rendering is performed on the character operation object in a corresponding window location according to the first display parameter. Referring to FIG. 5, rendering is performed, according to the first display parameter, on the character operation object associated with the second character object that meets the first preset condition (referring to the character operation object b12 shown in FIG. 5, an edge of an outer circle of the character operation object b12 has a rendering effect different from that of another character operation object, so that the character operation object b12 has a highlighted display effect). Compared with another character operation object, the character operation object (such as the character operation object b12) on which rendering is performed by using the first display parameter has an obvious distinguishing feature, so that the user of terminal can immediately identify the character operation object, and the user of the terminal can rapidly select the character operation object having an obvious distinguishing feature in a subsequent operation.

In this embodiment, for at least one character operation object that is in a character bar selection object in the GUI and on which rendering is performed according to the first display parameter, when the user of the terminal performs a trigger operation on the at least one character operation object, that is, when the terminal detects a selection operation gesture on the at least one character operation object, it indicates that a second character object associated with the character operation object is selected, and further, the first character object performs the first virtual operation on the second character object. Specifically, in the game system, the first virtual operation may be a physical attack operation or may be a skill release operation. When the first virtual operation is a physical attack operation, after the character operation object associated with the second character object is selected, the first character object directly performs the physical attack operation on the second character object. When a skill release operation is to performed, a skill object first needs to be selected by means of a skill selection operation gesture, and after the character operation object associated with the second character object is selected, the first character object performs, the skill release operation on the skill object, on the second character object.

Operation 405: Obtain status attribute information of a second character object in the GUI, and synchronize the status attribute information to a server, and obtain, from the server, status attribute information of a character object associated with a character operation object in the character container object.

Herein, the terminal obtains the status attribute information of the second character object in the GUI. Because the virtual space in which the first character object and the second character object are located may be relatively large based on a setting of the software application, the vision image in the GUI obtained through rendering by the terminal includes the first character object, and may include the second character object; and certainly, may not include the second character object. In this embodiment, the terminal obtains the status attribute information of the second character object included in the GUI, and synchronizes the corresponding second character object associated with the status attribute information to the server. The status attribute information includes, but is not limited to: a blood value, a hit point, or the skill attribute information of the second character object.

In this embodiment, the terminal obtains, from the server according to a preset rule, the status attribute information of the character object associated with the character operation object in the character container object, so that when the GUI of the terminal does not include at least some second character objects and status attribute information of the at least some second character objects cannot be obtained, status attribute information of second character objects associated with all character operation objects included in the character container object may be obtained by using a second character object and associated status attribute information that are synchronized by another terminal to the server. The terminal and the another terminal belong to a same group, and it may be understood that, the first character object controlled by the terminal and a first character object controlled by the another terminal belong to a same group in the game system, and a virtual operation is performed on second character objects that belong to another group. When the GUI of the terminal does not include all second character objects, a GUI of the another terminal may include at least some second character objects, so that based on obtained status attribute information of a second character object included in a GUI of at least one terminal that belongs to the same group, status attribute information of the second character objects is mutually synchronized.

Operation 406: Perform, according to the obtained status attribute information in a preset manner, rendering on the character operation object associated with the second character object in a corresponding window location.

Figure 9:
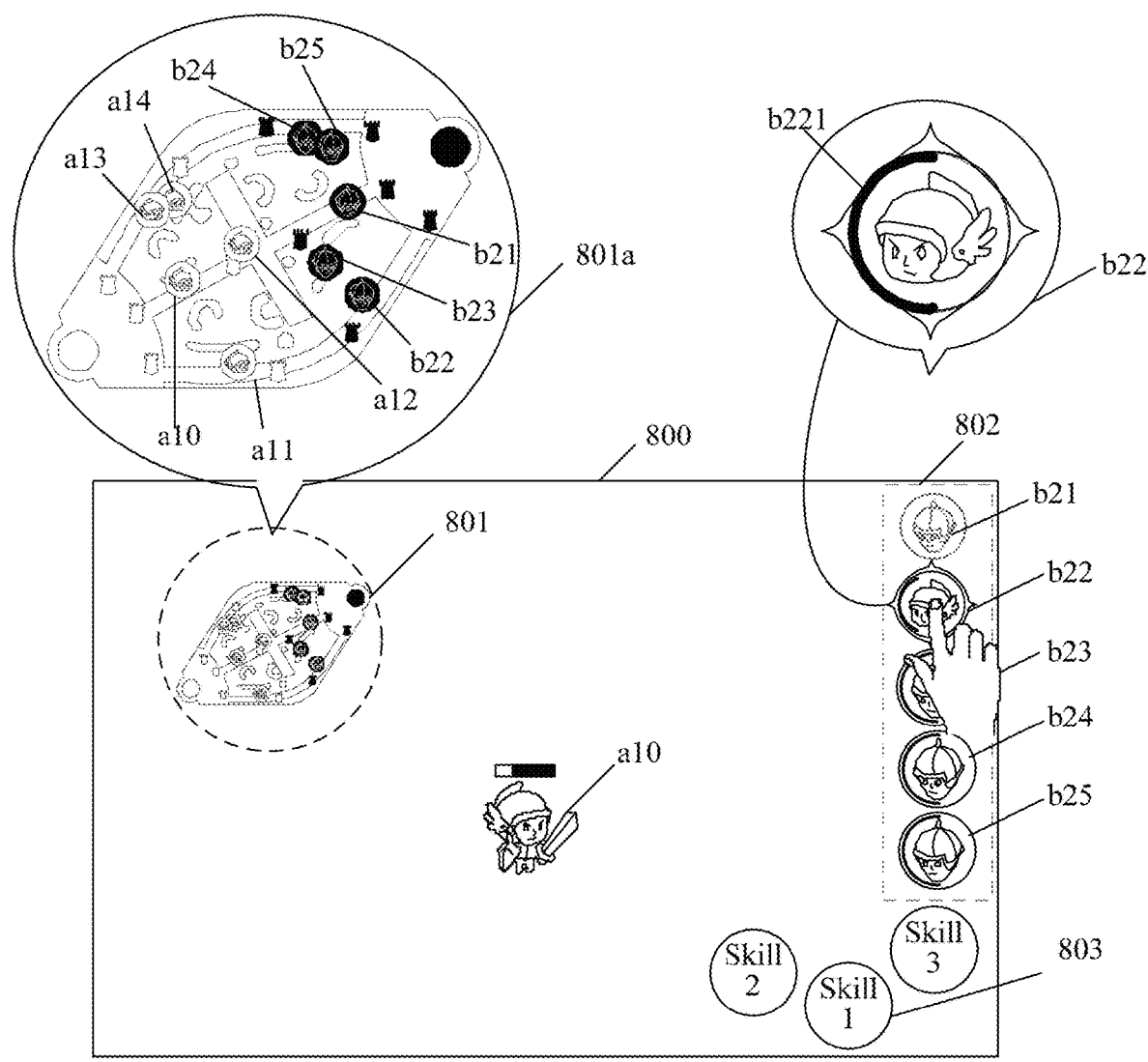
FIG. 9 is a third schematic diagram of a GUI in an information processing method according to some embodiments of the present technology.

Herein, after the status attribute information of the second character object is obtained by the terminal and synchronized by the server, rendering is performed, in a preset manner in the character container object, on the character operation object associated with the second character object in the corresponding window location. Specifically, FIG. 9 is a third schematic diagram of the GUI in the information processing method according to this embodiment of the present technology. As shown in FIG. 9, an example in which the status attribute information is a blood value is used. An area at an outer circle of a character operation object (referring to the character operation object b22 in FIG. 9) associated with the second character object is used as a blood groove display area b221, and a current blood value of a corresponding second character object is represented by using a proportion of a blood value in the blood groove display area b221 to the blood groove display area. Certainly, in this embodiment of the present technology, a manner of performing rendering on the status attribute information in a window location corresponding to the character operation object associated with the second character object is not limited to what is shown in FIG. 9.

Second character objects included in the GUIs of the terminal and the another terminal may not include all second character objects that interact with the second character objects and that belong to another group. Using a five-to-five application scenario as an example, group members that belong to a first group include: a group member 1, a group member 2, a group member 3, a group member 4, and a group member 5, and group members that belong to a second group include: a group member 6, a group member 7, a group member 8, a group member 9, and a group member 10. Assuming that the terminal controls the group member 1, the vision image in the GUI of the terminal includes only the group member 6, a vision image in a GUI of another terminal of the group member that belongs to the first group includes the group member 7, the group member 8, and the group member 9, and the group member 10 does not exist in a vision image in a GUI of any terminal controlled by the group member that belongs to the first group. On this basis, as shown in FIG. 9, the character operation object b21 presents a display effect that is different from that of another operation object, which is specifically displayed with a gray effect, and it indicates that a second character object corresponding to the character operation object b21 does not exist in a vision image of the first character object a10, and does not exist in a vision image of another character object that belongs to a same group as the first character object a10. Correspondingly, status attribute information of a second character object associated with the character operation object b21 is not displayed in an area at an outer circle of the character operation object b21.

By means of the technical solution in this embodiment of the present technology, on one hand, by means of a window location in a character container object deployed in a character selection area in a GUI, rendering is performed, in a corresponding window location, on a character operation object associated with a second character object that performs information exchange with a first character object, and rendering is performed, according to a first display parameter, on a character operation object associated with a second character object whose distance to the first character object meets a first preset condition, that is, rendering is performed, according to the first display parameter, on a UI avatar associated with the second character object whose distance to the first character object meets a first preset condition, so that the UI avatar has a display effect that is different from that of another UI avatar, and when a user selects a target character operation object, it is convenient for the user to rapidly and accurately select a target character object based on the different display effect by means of a selection operation gesture on the character operation object, thereby greatly improving operation experience of the user in an interaction process. On the other hand, status attribute information of the second character object associated with the character operation object in the character container object is obtained by synchronizing status attribute information of the character object (that is, a teammate) that is in a vision image and that belongs to the same group, and rendering is performed on the status attribute information in a corresponding window location in a particular manner, that is, the status attribute information of the second character object (that is, enemy) is reflected on a corresponding character operation object (a UI avatar), so that the user can rapidly learn the status attribute information of the second character object (that is, the enemy), thereby improving operation experience of the user in an information exchange process.

Figure 10:
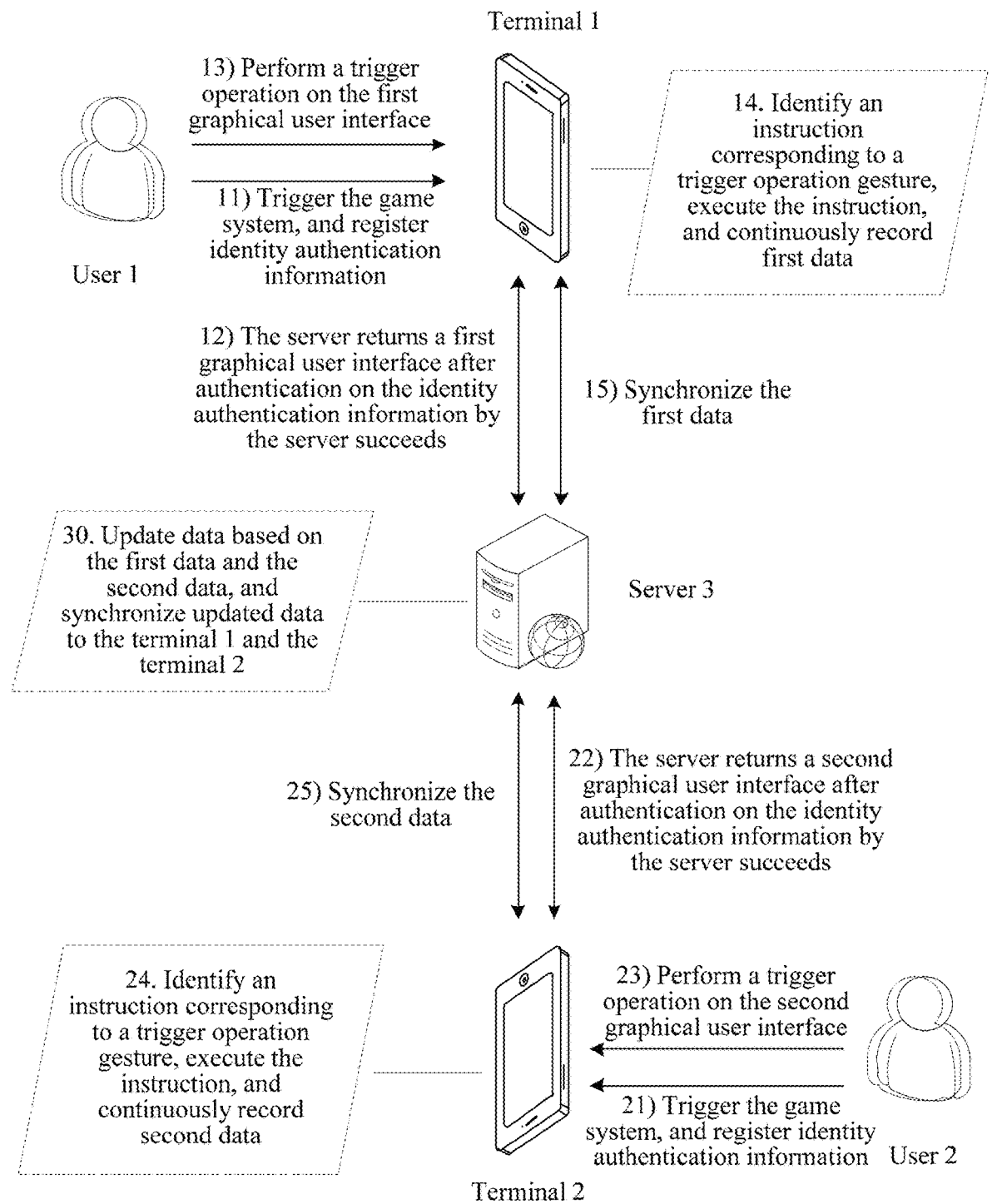
FIG. 10 is a schematic application diagram of interaction in an information processing method according to some embodiments of the present technology.

Based on some embodiments, a one-to-one application scenario is used as an example for detailed description below. The one-to-one application scenario is an application scenario in which a first character object controlled by a terminal 1 performs information exchange with a second character object controlled by a terminal 2. For other application scenarios, refer to descriptions in this application scenario, and details are not described in this embodiment again. FIG. 10 is a schematic application diagram of interaction in the information processing method according to this embodiment of the present technology. As shown in FIG. 10, in this application scenario, the terminal 1, the terminal 2, and a server are included. A user 1 performs triggering and control by using the terminal 1, and a user 2 performs triggering and control by using the terminal 2; and the method includes the following operations:

For the user 1, Operation 11: The user 1 triggers a game system and registers identity authentication information, where the identity authentication information may be a user name and a password.

Operation 12: The terminal 1 transmits the obtained identity authentication information to the server 3, and the server 3 performs identity authentication, and returns a first GUI to the terminal 1 after the identity authentication succeeds, where the first GUI includes a first character object, the first character object can perform a virtual operation based on a trigger operation of the user 1, and the virtual operation includes a moving operation of the first character object, an attack operation or a skill release operation of the first character object for another character object, and the like.

For the user 2, Operation 21: The user 2 triggers the game system and registers identity authentication information, where the identity authentication information may be a user name and a password.

Operation 22: The terminal 2 transmits the obtained identity authentication information to the server 3, and the server 3 performs identity authentication, and returns a second GUI to the terminal 2 after the identity authentication succeeds, where the second GUI includes a second character object, the second character object can perform a virtual operation based on a trigger operation of the user 2, and the virtual operation includes a moving operation of the second character object, an attack operation or a skill release operation of the second character object for another character object, and the like.

In this embodiment, the user 1 and the user 2 make, based on the trigger operation, the first character object and the second character object be information exchange objects, that is, the first character object uses the second character object as a target interaction object, and correspondingly, the second character object uses the first character object as a target interaction object. It may be understood that, when the user 1 and the user 2 serve as controlling parties in a game battle, rendering is performed on a character operation object associated with the second character object in a window location of a character container object in a character selection area in the first GUI; and correspondingly, rendering is performed on a character operation object associated with the first character object in a window location of a character container object in a character selection area in the second GUI. Further, the terminal 1 detects a distance between the second character object and the first character object in real time, and when the distance is within a range of a first preset threshold, performs rendering, according to a first display parameter, on the character operation object associated with the second character object in the window location, that is, highlights the character operation object. Correspondingly, the terminal 2 detects the distance between the first character object and the second character object in real time, and when the distance is within the range of the first preset threshold, performs rendering, according to the first display parameter, the character operation object associated with the first character object in the window location, that is, highlights the character operation object.

Till now, login operations and initialization operations of the user 1 and the user 2 in the game system are completed.

For the user 1, Operation 13: The user performs a trigger operation on the first GUI presented by the terminal 1, where the trigger operation may be performed on any virtual resource object in the first GUI, including a skill release operation on any skill object, an information exchange operation (which may be understood as a physical attack operation) on any character object, a moving operation of the first character object, and the like. In this embodiment, the trigger operation is selection gesture operation on a character operation object that is in the character container object in the first GUI and on which rendering is performed according to the first display parameter.

Operation 14: The terminal 1 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data. In this embodiment, when obtaining the selection gesture operation on the character operation object on which rendering is performed according to the first display parameter, the terminal 1 generates a corresponding first instruction, and executes the first instruction to control the first character object to perform a virtual operation (such as a physical attack operation or a skill release operation) on the corresponding second character object.

Operation 15: Use changed data as first data corresponding to the terminal 1 and synchronize the first data to the server 3.

For the user 2, Operation 23: The user performs a trigger operation on the second GUI presented by the terminal 2, where the trigger operation may be performed on any virtual resource object in the second GUI, including a skill release operation on any skill object, an information exchange operation (which may be understood as a physical attack operation) on any character object, a moving operation of the second character object, and the like. In this embodiment, the trigger operation is a selection gesture operation on a character operation object that is in the character container object in the second GUI and on which rendering is performed according to the first display parameter.

Operation 24: The terminal 2 identifies, when obtaining a trigger operation, an instruction corresponding to the trigger operation gesture; executes the instruction, for example, executes a skill release instruction for a corresponding operation object, executes an information exchange instruction (such as a physical attack instruction) for a corresponding character object, or executes a moving instruction; and in a process of executing the instruction, records a change of corresponding data. In this embodiment, when obtaining the selection gesture operation on the character operation object on which rendering is performed according to the first display parameter, the terminal 2 generates a corresponding second instruction, and executes the second instruction to control the second character object to perform a virtual operation (such as a physical attack operation or a skill release operation) on the corresponding first character object.

Operation 25: Use changed data as second data corresponding to the terminal 2 and synchronize the second data to the server 3.

For the server 3, Operation 30: Update data based on the first data synchronized by the terminal 1 and the second data synchronized by the terminal 2, and synchronize updated data respectively to the terminal 1 and the terminal 2.

Referring to the descriptions of the foregoing method embodiment, an actual application scenario is used as an example to describe this embodiment of the present technology as follows: This application scenario is related to Multiplayer Online Battle Arena Games (MOBA). In MOBA, related terms are as follows: 1) UI layer, that is, an icon in a GUI; 2) skill indicator: a special effect, a halo, or an operation used to supplement skill release; 3) virtual lens, which may be understood as a camera in the game; and 4) mini map: a scaled-down version of a large map, which may be understood as a radar map, where information and locations of two parties are displayed in the map.

Figure 11:
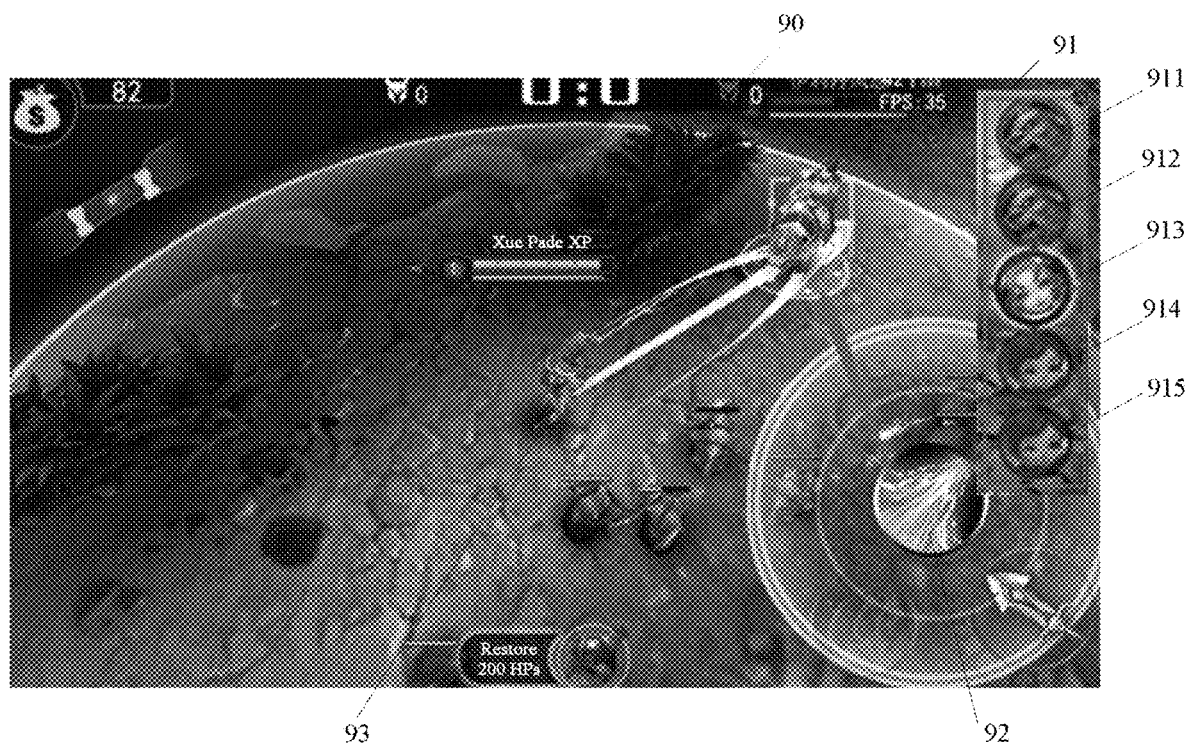
FIG. 11 is a fourth schematic diagram of a GUI in an information processing method according to some embodiments of the present technology.

FIG. 11 is a fourth schematic diagram of the GUI in the information processing method according to this embodiment of the present technology. This example is based on an application scenario used in an actual interaction process. Referring to FIG. 11, in this embodiment, a first character object 93 and at least one skill object 92 are obtained through rendering; and the first character object 93 can perform a corresponding virtual operation based on a trigger operation of a user. The GUI 90 further includes a character selection area 91, and the character selection area 91 includes a character container object. In this example, the character container object includes five window locations. One character operation object is obtained through rendering in each window location, including a character operation object 911, a character operation object 912, a character operation object 913, a character operation object 914, and a character operation object 915. Each character operation object is associated with one character object. The five character objects are all character objects that belong to a group that is different from the first character object 93, that is, the five character objects serve as enemy of the first character object 93 for interaction. In this application scenario, the first character object 93 detects, in real time, a second character object that is in the GUI 90 and whose distance to the first character object 93 meets the first preset threshold, and performs, according to the first display parameter, rendering on a character operation object associated with a corresponding second character object, where the first preset threshold may be set to a skill release distance of a skill object according to an actual requirement, and certainly is not limited to the foregoing setting manner. For example, compared with another character operation object, the character operation object 913 shown in FIG. 10 has a highlighted display effect. On this basis, the user can rapidly and accurately select a target character object based on the different display effect by means of a selection operation gesture on the character operation object, to perform a virtual operation on the target character object, thereby greatly improving operation experience of the user in an interaction process.

Based on the above, an information processing method is performed at a first gaming terminal, wherein the first gaming terminal corresponds to a first game player in a game, and wherein the first gaming terminal comprises one or more processors and memory. The method includes: displaying a first game scene from a first viewing perspective corresponding to the first game player in the game, wherein the first game scene includes a plurality of game characters with which the first game player is configured to interact with in the game. For example, the first game scene corresponds to only a portion of the game space that the game character of the first game player can roam or navigate to. Within the first game scene, there are game characters that are controlled by the game server or computers, and there are also game characters that are controlled by other game players. Each of the game characters have a respective avatar that helps the players to visually identify the game characters. In some embodiments, the game characters are divided into friendly characters and enemy characters, and enemy characters may be computer-controlled enemies or game characters that are controlled by players on the opposing team. Friendly characters, similarly, can be characters controlled by the computers, or characters controlled by players on the same game team as the player at the current terminal.

The method further includes: displaying, concurrently with the first game scene, a character selection area that is distinct from the first game scene, including displaying, within the character selection area, respective avatars corresponding a first subset of the plurality of game characters that are currently eligible targets of a first game operation associated with the first game player. For example, in addition to the game scene which may include representations of game characters, there are additional user interface windows or areas that display avatars of game characters, for example, to show which characters are on which teams, and what the statuses of the different characters are. Conventionally, only the main game characters are presented in the character selection area, and the enemy characters in a current scene may not be represented in the character selection area. In the present method, avatars of the enemy characters, including ones that are not controlled by other players, and are computer-controlled, are also represented in the character selection area, such that they may be selected by the user more conveniently in the character selection area as opposed to being selected directly by gestures on the first game scene. In some embodiments, the avatars of the eligible targets are highlighted in the character selection region, while any avatar for characters within the first game scene but are not eligible targets at the moment are displayed in a dimmed manner (e.g., grayed out and not selectable by tap). When the game characters move around in the first game scene, some previously eligible targets may no longer be eligible targets, and their avatars are dimmed, while some other previously ineligible targets may become eligible targets, and their avatars are highlighted. In some embodiments, when multiple targets of the same type are clustered together at the same location on the first game scene, a single avatar is optionally used to represent them and a count indicator is displayed to indicate how many targets the avatar is representing. In some embodiments, the character selection region are optionally divided into a number of zones, and each zone corresponds to a portion of the first game scene (e.g., four zones corresponding to four quadrants of the first game scene), and the game characters that are eligible targets in each portion of the first game scene are displayed in the zone corresponding to the portion of the first game scene. In some embodiments, the avatars are sorted and grouped based on character type. In some embodiments, the avatars are sorted and grouped by their corresponding characters' heading directions relative to the first game player in the game. In some embodiments, the avatars are sorted and grouped by the type of game operations that their corresponding characters' respond to. In some embodiments, if a target is in the attack range of multiple players on the first game players team, the avatars for those characters are indicated differently from the avatars for the characters that are only within the target range of the first game player.

The method includes: detecting a selection input directed to at least a first avatar in the character selection area that corresponds to a first game character of the first subset of the plurality of game characters; and in response to detecting the selection input directed to at least the first avatar in the character selection area that corresponds to the first game character of the first subset of the plurality of game characters, selecting the first game character in the first game scene as a target of the first game operation associated with the first game player. For example, when the game characters that are eligible targets for the first game operation of the first game player are highlighted in the character selection area, the user may tap on the avatars or swipe across multiple avatars to select them all at once, rather than having to tap each one of the game characters in the first game scene. Once the avatars are selected, the corresponding game characters will be targeted to receive the first game operation when the first game operation is performed by the first game player.

In some embodiments, displaying the character selection area further includes: displaying, within the character selection area, respective avatars corresponding to a second subset of the plurality of game characters that are currently not eligible targets of the first game operation associated with the first game player, wherein the avatars of the first subset of the plurality of game characters are visually distinguished from the avatars of the second subset of the plurality of game characters in the character selection area based on a first visual effect applied to the avatars of only one of the first or second subset of game characters. In some embodiments, the method includes: while concurrently displaying the first game scene and the character selection area, detecting changes in the game characters displayed within the first game scene, wherein the changes in the game characters cause at least one game character in the first subset of the plurality of game characters to become an ineligible target for the first game operation associated with the first game player; and in response to detecting the changes in the game characters within the first game scene, updating the character selection area, including changing a visual appearance of the avatar corresponding to the at least one game character to reflect that the at least one game character is no longer in the first subset of the plurality of game characters and is now in the second subset of the plurality of game characters. In some embodiments, the changes in the game characters include at least one of: the at least one game character has exited a target range of the first game operation associated with the first game player, and the at least one game character has changed status and become immune to the first game operation associated with the first game player. For example, the avatars for some game characters are highlighted (e.g., by color or highlight) if they have become eligible targets for the first game operation (or any game operation) of the first game player. Alternatively, the avatars for some game characters are grayed out or dimmed if they have become ineligible targets for the first game operation (or any game operation) of the first game player. The character selection area is continually updated in real time based on the situations in the first game scene, as characters move, change their statuses (e.g., acquire new skills, gets killed, or eliminated otherwise).

In some embodiments, the game is a group game, and the plurality of game characters include a respective game character that corresponds to a second game player using a second gaming terminal, and a respective avatar of the second game character is displayed within the character selection area, and wherein the method includes: determining a predefined enemy status for enemy characters within a second game scene from a viewing perspective of the second game player; and displaying a respective indicator object in association with the respective avatar of the second game character, wherein the respective indicator object indicates a summary of the predefined enemy status for enemy characters within the second game scene from the viewing perspective of the second game player. For example, a bar of total blood/life indicting the total amount of blood/life remaining with the enemy characters within the attack range of the second game player (e.g., the team member of the first game player) is displayed next to the avatar of the team member. In some embodiments, if the second game player is visible in the first game scene, this indicator is optionally displayed next to the representation of the second game player in the first game scene.

In some embodiments, the method includes: determining the predefined enemy status for a subset of the enemy characters that are within both the first game scene and the second game scene; and displaying an adjustment to the respective indicator object that indicates a summary of the predefined enemy status for the subset of the enemy characters that are within both the first game scene and the second game scene. For example, in some embodiments, the attack ranges of two team members (e.g., the first game player and the second game player), and the indicator reflecting the total amount of life/blood within each player's attack zone may over-estimate the enemy status. A modification indicator, e.g., a portion of the indicator object may be colored differently from the rest of the indicator object to indicate the amount of the enemy status that are for enemy characters within the attack zones of both the first game player and the second game player. In some embodiments, the summary of the predefined enemy status includes a total amount of enemy life remaining, or total enemy ammunition, or a total enemy count, within an attack range of a respective game character for which the summary is being determined.

In some embodiments, the information processing method includes: at the first gaming terminal of a plurality of gaming terminals engaged in a group game, wherein the first gaming terminal corresponds to the first game player, and the second gaming terminal of the plurality of gaming terminals corresponds to the second game player distinct from the first game player: displaying the first game scene from the first viewing perspective corresponding to the first game player in the group game (e.g., the game scene as viewed by the first user at the first gaming terminal, the game scene may be a first person view, a bird's eye view, or a God's eye view, depending on the game design). In some embodiments, the first game scene displays a portion of the game world, and not all game characters in the game are visible in the first game scene. For example, different team members of the first game player may be located at different portions of the game world, and the user has to move the game characters or manually pan the viewing window (e.g., by swipe gesture, or by moving a controller) to see other portions of the game world. Each game terminal may display a different view of the game world, depending on the location of the game characters that are controlled by the different users.

In some embodiments, the method further includes: displaying, concurrently with the first game scene, a game avatar corresponding to the second game player. For example, in an area (e.g., a portion of the character selection area) of the game user interface, the user's team members are listed in a team member selection area as different avatars representing the game characters controlled by the different team members. In some embodiments, the avatars also include status indicators to indicate their levels, health, skills, etc. In some embodiments, the method further includes: while displaying the first game scene from the first viewing perspective corresponding to the first game player, detecting a user input directed to the game avatar corresponding to the second game player, wherein the user input meets predefined team-view criteria; in response to detecting the user input that is directed to the game avatar corresponding to the second game player, and in accordance with a determination that the user input meets the predefined team-view criteria: retrieving a second game scene from a second viewing perspective corresponding to the second game player, wherein the second game scene is distinct from the first game scene and the second game is currently displayed at the second game terminal; and displaying at least a portion of the second game scene at the first gaming terminal. For example, the team-view criteria are met when the user input corresponds to the "vision obtaining gesture", such as a long press on the avatar of a team member, or a tap on the avatar, or a deep press on the avatar. In response to the selection of a team member and the gesture meeting the requirement for the team-viewing criteria, the first terminal requests, e.g., from the game server, or from the second terminal directly, the data for displaying the second game scene as seen by the user at the second gaming terminal. In some embodiments, the second game scene is displayed in a pop-up window shown above the selected avatar. In some embodiments, the second game scene is displayed overlaid on the first game scene briefly for as long as the gesture is not terminated.

In some embodiments, displaying at least the portion of the second game scene includes continuing to update the second game screen displayed at the first gaming terminal in accordance with updates made to the second game scene currently displayed at the second gaming terminal. This is so that the player can see the movement and actions of the characters in the game scenes as the game develops during the gesture input.

In some embodiments, while displaying the second game scene at the first gaming terminal, detecting termination of the user input (e.g., lift-off of the contact from the avatar, or moving away from the avatar to a second avatar to trigger the display of game scene of yet another game player): in response to detecting the termination of the user input: in accordance with a determination that the user input has met temporary-display criteria (e.g., a touch-hold with intensity below a predefined intensity threshold, or a touch-hold with less than a predefined threshold duration), ceasing to display at least the portion of the second game scene at the first gaming terminal upon termination of the input (e.g., upon lift-off of the contact); and in accordance with a determination that the user input has met sustained-display criteria (e.g., a press input with intensity above the predefined intensity threshold, or a touch-hold with a duration longer than the predefined threshold duration), maintaining display of the portion of the second game scene at the first gaming terminal while continuing to update the second game screen displayed at the first gaming terminal in accordance with updates made to the second game scene currently displayed at the second gaming terminal (e.g., the pop-up window is pinned at a predefined location on the game UI, e.g., in a dedicated area for displaying game scenes from other game players).

In some embodiments, the method further include: monitoring a status of the second game player (e.g., a skills, the status for getting ready (based on requirements on wait time, points, items, etc.) to release a special skill or attack); determining whether the status of the second game player meets predefined status-event criteria (e.g., the status-event criteria are met when the character is ready to release a skill or predefined attack); and in response to determining that the status of the second game player meets the predefined status-event criteria: in accordance with a determination that the second game scene from the viewing perspective of the second game player is not currently displayed at the first gaming terminal, displaying the second game scene from the viewing perspective of the second game player at the first gaming terminal; and in accordance with a determination that the second game scene from the viewing perspective of the second game player is currently displayed at the first gaming terminal, maintaining display of the second game scene from the viewing perspective of the second game player at the first gaming terminal. In some embodiments, the status-event criteria are met by the status of the second game player when the second game player is ready to release a predefined game move.

In some embodiments, the method includes: while displaying the second game scene at the first gaming terminal, detecting a second user input that meets scene-capture criteria (e.g., a screen capture input is detected); in response to detecting the second user input that meets the scene-capture criteria: capture the first game scene and the second game scene that are currently displayed at the first gaming terminal; and storing the first game scene and the second game scene in a library that is accessible through a post-game analysis interface of the group game. In some embodiments, the post-game analysis interface is concurrently displayed to multiple users from the same team, concurrently with a group chat interface, so that the team members can go through the game strategy and perform better in future games.

In some embodiments, the method include: receiving an indication that the second gaming terminal has requested to display the first game scene at the second gaming terminal; and in response to receiving the indication that the second gaming terminal has requested to display the first game scene at the second gaming terminal, displaying an indicator in association with the avatar corresponding to the second game player while the first game scene remains displayed at the second gaming terminal. For example, if other users have selected the first game player's avatar on their terminals to show the game scene as viewed by the first game player, the avatars of those other users are highlighted or have an "eye" indicator displayed next to them, so that the user at the first terminal knows who else on the team can see what he is seeing.

In some embodiments, when two team members are exchanging game views (e.g., each showing the game scene of the other), the first terminal optionally eliminates the replica of the first game scene from the view of the second game scene that is obtained from the second gaming terminal.

Other details of the method are disclosed with respect to other embodiments, and may be combined with the features of this method without limitation. In the interest of brevity, all features are not exhaustively repeated herein.

Figure 12:
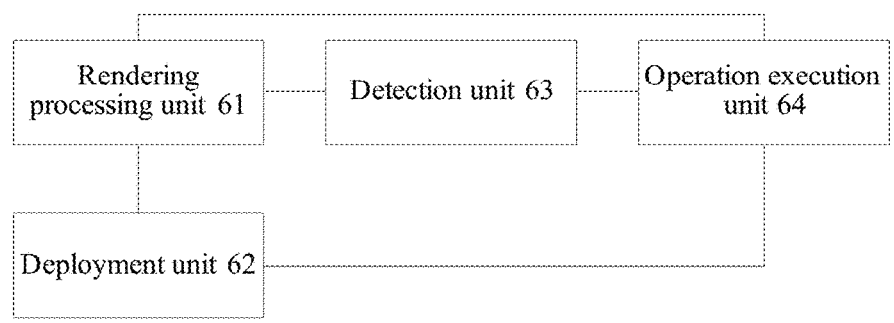
FIG. 12 is a schematic structural diagram of a terminal according to some embodiments of the present technology.

FIG. 12 is a schematic structural diagram of the terminal according to some embodiments of the present technology. As shown in FIG. 12, the terminal includes: a rendering processing unit 61, a deployment unit 62, a detection unit 63, and an operation execution unit 64.

The rendering processing unit 61 is configured to: execute a software application and perform rendering, to obtain a GUI; and perform rendering in the GUI, to obtain at least one virtual resource object, at least one of the virtual resource object being configured as a first character object that performs a first virtual operation according to an input first user command; and being further configured to perform, according to a first display parameter, rendering on a character operation object detected by the detection unit 63 and associated with the second character object in the at least one window location.

The deployment unit 62 is configured to: deploy in such a manner that at least one character container object in at least one character selection area in the GUI includes at least one window location.

The detection unit 63 is configured to detect a second character object that is in the GUI and whose distance to the first character object meets a first preset condition.

The operation execution unit 64 is configured to: perform, by the first character object, at least one of the first virtual operation on a corresponding second character object when a selection operation gesture on at least one character operation object on which rendering is performed according to the first display parameter and that is in the character container object is detected.

In this embodiment, the GUI includes the at least one character selection area, the character selection area includes the at least one character container object, and the character container object includes the at least one window location. Corresponding character operation objects are carried in at least some window locations. The character operation object may be represented by using an identifier (the identifier may be an avatar) of a character object associated with the character operation object in the GUI. Herein, the second character object associated with the character operation object and the first character object belong to different groups. A manner of rendering on the character container object in the character selection area includes, but is not limited to: a bar shape or an annular shape, that is, the character container object may be represented by using a character selection bar object or a character selection wheel object.

Specifically, referring to FIG. 3, the GUI obtained through rendering by the rendering processing unit 61 includes the at least one virtual resource object. The virtual resource object includes at least one first character object a10. A user of the terminal may perform information exchange by using the GUI, that is, input a user command. The first character object a11) can perform a first virtual operation based on a first user command detected by the terminal, where the first virtual operation includes, but is not limited to: a moving operation, a physical attack operation, a skill attack operation, and the like. It may be understood that, the first character object a10 is a character object controlled by the user of the terminal. In the game system, the first character object a10 can perform a corresponding action in the GUI based on an operation of the user. In an implementation, the GUI further includes a mini map 801 of a virtual area in which the user character object is located. A schematic detailed method drawing of the mini map 801 is shown by 801a. As can be learned, a location of each character object (including a friend that belongs to a first group with the first character object a10 and enemy that belongs to a second group) in the virtual area is identified in the mini map 801. The GUI further includes at least one skill object 803, and the user may control, by means of a skill release operation, the user character object to perform a corresponding skill release operation.

In the example shown in FIG. 3, the deployment unit 62 deploys a character selection area 802 in the GUI, and deploys a character container object in the character selection area 802. In this example, the character container object is represented by using a character selection bar object (that is, the character container object presents a display effect of a bar shape). The character container object includes at least one window location, and rendering is performed, in a corresponding window location, on a character operation object associated with a second character object that interacts with the first character object. An example in which the character operation object is represented by using an avatar is used, that is, the character selection area 802 includes at least one avatar. The at least one avatar is respectively in a one-to-one correspondence with at least one second character object that interacts with the first character object. As shown in FIG. 3, a five-to-five application scenario is used in this example. There are five second character objects that belong to a group different from that of the first character object a10, and correspondingly, there are five character operation objects in the character selection area 802, for example, a character operation object b11, a character operation object b12, a character operation object b13, a character operation object b14, and a character operation object b15 shown in FIG. 3. It may be understood that, the five character operation objects in the character selection area 802 are in a one-to-one correspondence with the second character objects that belong to groups different from that of the first character object.

Based on the example of the GUI shown in FIG. 3, during control by the user of the terminal, a location of the first character object changes in real time, and correspondingly, a location of the second character object in the GUI changes in real time. On this basis, in a process in which the first character object performs a virtual operation on the second character object, it is not easy for the user of the terminal to select a character object on which a virtual operation is to be performed. On this basis, in this embodiment, the detection unit 63 detects the second character object that is in the GUI and whose distance to the first character object meets the first preset condition.

Specifically, the detection unit 63 is configured to detect a second character object that is in the GUI and whose distance to the first character object is less than a first preset threshold.

Referring to FIG. 4, the detection unit 63 detects a circular area using the first character object 1 as a circle center and using the first preset threshold (R) as a radius, to obtain an area range of the circular area, where the area range may be represented by using a coordinate range. That is, an XY coordinate system is established in virtual space in which the first character object and the second character object are located, and a coordinate range of the circular area in the XY coordinate system is obtained. Further, the detection unit 63 detects a coordinate of a second character object in the GUI in real time, determines whether the detected coordinate is within the coordinate range representing the circular area, and when determining that there is a coordinate within the coordinate range representing the circular area (for example, a second character object 2, a second character object 3, and a second character object 4 shown in FIG. 4 are all in the circular area), detects a second character object that is in the GUI and whose distance to the first character object is less than the first preset threshold. The first preset threshold meets an attack distance or a skill release distance of the first character object, so that in a subsequent operation process, it is convenient to rapidly select the second character object and it is convenient for the first character object to perform a virtual operation on the second character object.

In an implementation, the detection unit 63 is further configured to detect, in second character objects whose distances to the first character object meet the first preset condition, at least some second character objects whose distances to the first character object meet a second preset condition; and correspondingly, the rendering processing unit 61 is configured to: perform, according to a second display parameter, rendering on character operation objects associated with the at least some second character objects detected by the detection unit 63 in the at least one window location, where a display effect obtained by performing rendering according to the second display parameter is different from a display effect obtained by performing rendering according to the first display parameter.

Specifically, the detection unit 63 is configured to detect, in the second character objects whose distances to the first character object meet the first preset condition, a second character object whose distance to the first character object reaches a second preset threshold, where the second preset threshold is greater than or equal to the first preset threshold.

Herein, referring to FIG. 7, for the second character objects whose distances to the first character object meet the first preset condition (for example, the second character object 2, the second character object 3, and the second character object 4 shown in FIG. 4 all meet the first preset condition), that is, second character objects whose previous coordinate values are in the circular area using the first preset threshold (R) as a radius, because a location of the second character object in the GUI changes in real time, on this basis, before the detection unit 63 detects a selection operation gesture on at least one character operation object on which rendering is performed according to the first display parameter and that is in the character container object, the detection unit 63 detects, in real time, the coordinate value of the second character object whose previous coordinate value is in the circular area using the first preset threshold (R) as a radius, and determines whether the coordinate value is in a circular area using the second preset threshold (r shown in FIG. 7) as a radius and using the first character object as a circle center. In the example shown in FIG. 7, the second preset threshold (r) is greater than the first preset threshold (R), that is, in the second character objects whose previous coordinate values are in the circular area using the first preset threshold as a radius, as the first character object and the second character objects move in real time, at least some second character objects move to make distances between at least some second character objects and the first character object be greater than the first preset threshold (R) and reach the second preset threshold (r), for example, the second character object 4 shown in FIG. 7. Further, an operation state in which character operation objects associated with the at least some second character objects can be selected is deactivated, and rendering is performed on the character operation object in the corresponding window location according to the second display parameter. In an implementation, the second display parameter may be a conventional display parameter, that is, in the GUI, rendering is performed, according to the second display parameter, on all other virtual resource objects than the character operation object that is displayed according to the first display parameter.

In an implementation, the rendering processing unit 61 performs rendering, in a corresponding window location according to the first display parameter, on the character operation object associated with the second character object that meets the first preset condition. Referring to FIG. 5, rendering is performed, according to the first display parameter, on the character operation object associated with the second character object that meets the first preset condition (referring to the character operation object b12 shown in FIG. 5, an edge of an outer circle of the character operation object b12 has a rendering effect different from that of another character operation object, so that the character operation object b12 has a highlighted display effect). Compared with another character operation object, the character operation object (such as the character operation object b12) on which rendering is performed by using the first display parameter has an obvious distinguishing feature, so that the user of terminal can immediately identify the character operation object, and the user of the terminal can rapidly select the character operation object having an obvious distinguishing feature in a subsequent operation.

A person skilled in the art should understand that functions of processing units in the terminal in this embodiment of the present technology may be understood by referring to related descriptions of the information processing method. The processing units in the information processing terminal in this embodiment of the present technology may be implemented by implementing an analog circuit having the function in this embodiment of the present technology or may be implemented by running software having the function in this embodiment of the present technology on an intelligent terminal.

Figure 13:
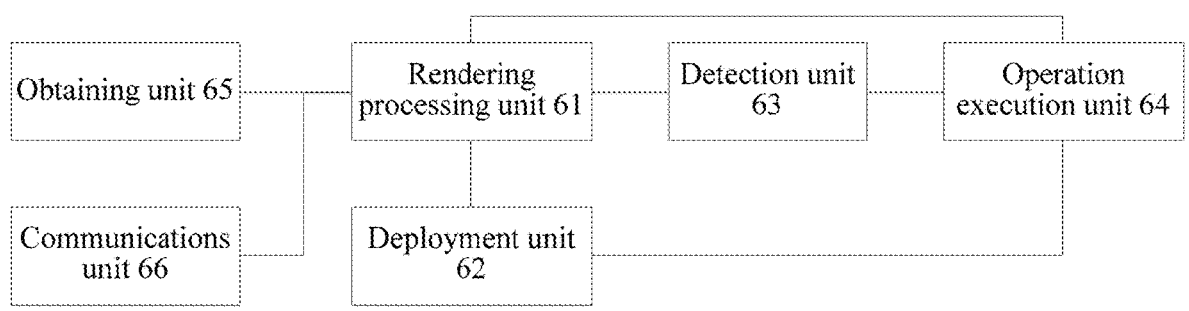
FIG. 13 is a schematic structural diagram of a terminal according to some embodiments of the present technology.

FIG. 13 is a schematic structural diagram of the terminal according to some embodiments of the present technology. As shown in FIG. 13, the terminal includes: a rendering processing unit 61, a deployment unit 62, a detection unit 63, an operation execution unit 64, an obtaining unit 65, and a communications unit 66.

The rendering processing unit 61 is configured to: execute a software application and perform rendering, to obtain a GUI; and perform rendering in the GUI, to obtain at least one virtual resource object, at least one of the virtual resource object being configured as a first character object that performs a first virtual operation according to an input first user command; and being further configured to perform, according to a first display parameter, rendering on a character operation object detected by the detection unit 63 and associated with the second character object in the at least one window location.

The deployment unit 62 is configured to: deploy in such a manner that at least one character container object in at least one character selection area in the GUI includes at least one window location.

The detection unit 63 is configured to detect a second character object that is in the GUI and whose distance to the first character object meets a first preset condition.

The operation execution unit 64 is configured to: perform, by the first character object, at least one of the first virtual operation on a corresponding second character object when a selection operation gesture on at least one character operation object on which rendering is performed according to the first display parameter and that is in the character container object is detected.

The obtaining unit 65 is configured to obtain status attribute information of a second character object in the GUI.

The communications unit 66 is configured to: synchronize the status attribute information obtained by the obtaining unit 65 to a server, and obtain, from the server, status attribute information of a character object associated with a character operation object in the character container object.

In an implementation, the rendering processing unit 61 is configured to perform, according to the obtained status attribute information in a preset manner, rendering on the character operation object associated with the second character object in a corresponding window location.

In this embodiment, for functions of the rendering processing unit 61, the deployment unit 62, the detection unit 63, and the operation execution unit 64, refer to descriptions of various embodiments and details are not described herein again. A difference is that the obtaining unit 65 obtains the status attribute information of the second character object in the GUI. Because the virtual space in which the first character object and the second character object are located may be relatively large based on a setting of the software application, the vision image in the GUI obtained through rendering by the terminal includes the first character object, and may include the second character object; and certainly, may not include the second character object. In this embodiment, the terminal obtains the status attribute information of the second character object included in the GUI, and synchronizes the corresponding second character object associated with the status attribute information to the server. The status attribute information includes, but is not limited to: a blood value, a hit point, or the skill attribute information of the second character object.

In this embodiment, the communications unit 66 obtains, from the server according to a preset rule, the status attribute information of the character object associated with the character operation object in the character container object, so that when the GUI of the terminal does not include at least some second character objects and status attribute information of the at least some second character objects cannot be obtained, status attribute information of second character objects associated with all character operation objects included in the character container object may be obtained by using a second character object and associated status attribute information that are synchronized by another terminal to the server. The terminal and the another terminal belong to a same group, and it may be understood that, the first character object controlled by the terminal and a first character object controlled by the another terminal belong to a same group in the game system, and a virtual operation is performed on second character objects that belong to another group. When the GUI of the terminal does not include all second character objects, a GUI of the another terminal may include at least some second character objects, so that based on obtained status attribute information of a second character object included in a GUI of at least one terminal that belongs to the same group, status attribute information of the second character objects is mutually synchronized.

In this embodiment, after the status attribute information of the second character object is obtained by the terminal and synchronized by the server, rendering is performed, in a preset manner in the character container object, on the character operation object associated with the second character object in the corresponding window location. Specifically, referring to FIG. 9, an example in which the status attribute information is a blood value is used. An area at an outer circle of a character operation object (referring to the character operation object b22 in FIG. 9) associated with the second character object is used as a blood groove display area b221, and a current blood value of a corresponding second character object is represented by using a proportion of a blood value in the blood groove display area b221 to the blood groove display area. Certainly, in this embodiment of the present technology, a manner of performing rendering on the status attribute information in a window location corresponding to the character operation object associated with the second character object is not limited to what is shown in FIG. 9.

A person skilled in the art should understand that functions of processing units in the terminal in this embodiment of the present technology may be understood by referring to related descriptions of the information processing method. The processing units in the information processing terminal in this embodiment of the present technology may be implemented by implementing an analog circuit having the function in this embodiment of the present technology or may be implemented by running software having the function in this embodiment of the present technology on an intelligent terminal.

In some embodiments of the present technology, in an actual application, the rendering processing unit 61, the deployment unit 62, the detection unit 63, the operation execution unit 64, and the obtaining unit 65 in the terminal may all be implemented by a central processing unit (CPU), a digital signal processor (DSP) or a field programmable gate array (FPGA) in the terminal; and in an actual application, the communications unit 66 in the terminal may be implemented by a transceiver antenna or a communications interface in the terminal.

This embodiment of the present technology further provides a terminal. The terminal may be an electronic device such as a PC or may be a portable electronic device such as a tablet computer, a laptop computer, or a smartphone. A game system is executed in the terminal by installing a software application (such as a game application), and the terminal includes at least a memory for storing data and a processor for data processing. For the processor for data processing, during processing, a microprocessor, a CPU, a DSP, or an FPGA may be used for implementation. The memory includes an operation instruction, the operation instruction may be computer executable code, and operations in the procedure of the information processing method in the embodiments of the present technology are implemented by using the operation instruction.

Figure 14:
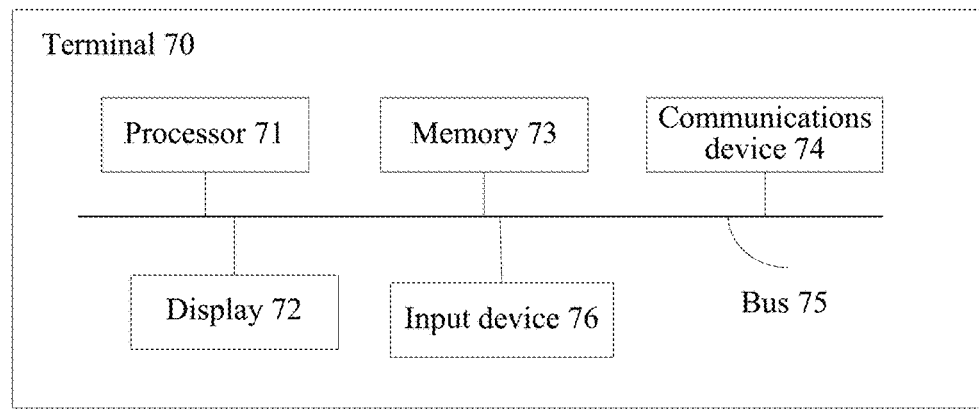
FIG. 14 is a schematic structural diagram of a terminal according to some embodiments of the present technology.

FIG. 14 is a schematic structural diagram of a terminal according to some embodiments of the present technology. As shown in FIG. 14, the terminal includes: a processor 71 and a display 72. The processor 71 is configured to: execute a software application and perform rendering on the display 72, to obtain a GUI. The processor, the GUI, and the software application are implemented on a game system.

The processor 71 is further configured to perform rendering in the GUI, to obtain at least one virtual resource object, at least one of the virtual resource object being configured as a first character object that performs a first virtual operation according to an input first user command;

deploy in such a manner that at least one character container object in at least one character selection area in the GUI includes at least one window location;

detect a second character object that is in the GUI and whose distance to the first character object meets a first preset condition, and perform, according to a first display parameter, rendering on a detected character operation object associated with the second character object in the at least one window location; and perform, by the first character object, at least one of the first virtual operation on a corresponding second character object when detecting a selection operation gesture on at least one character operation object on which rendering is performed according to the first display parameter and that is in the character container object.

Specifically, the detecting, by the processor 71, a second character object that is in the GUI and whose distance to the first character object meets a first preset condition includes:

detecting a second character object that is in the GUI and whose distance to the first character object is less than a first preset threshold.

In an implementation, the processor 71 is further configured to: before detecting the selection operation gesture on the at least one character operation object on which rendering is performed according to the first display parameter and that is in the character container object, detect, in second character objects whose distances to the first character object meet the first preset condition, at least some second character objects whose distances to the first character object meet a second preset condition, and perform, according to a second display parameter, rendering on character operation objects associated with the detected at least some second character objects in the at least one window location, where a display effect obtained by performing rendering according to the second display parameter is different from a display effect obtained by performing rendering according to the first display parameter.

Specifically, the detecting, by the processor 71 in second character objects whose distances to the first character object meet the first preset condition, at least some second character objects whose distances to the first character object meet a second preset condition includes:

detecting, in the second character objects whose distances to the first character object meet the first preset condition, a second character object whose distance to the first character object reaches a second preset threshold, where the second preset threshold is greater than or equal to the first preset threshold.

In an implementation, the terminal further includes a communications device 74.

The processor 71 is further configured to: obtain status attribute information of a second character object in the GUI, and synchronize the status attribute information to a server by using the communications device 74; and obtain, from the server by using the communications interface, status attribute information of a character object associated with a character operation object in the character container object.

Correspondingly, the processor 71 is further configured to perform, according to the obtained status attribute information in a preset manner, rendering on the character operation object associated with the second character object in a corresponding window location.

In this embodiment, the terminal includes: the processor 71, the display 72, a memory 73, an input device 76, a bus 75, and the communications device 74. The processor 71, the memory 73, the input device 76, the display 72, and the communications device 74 are all connected by using the bus 75, and the bus 75 is configured to transmit data between the processor 71, the memory 73, the display 72, and the communications device 74.

The input device 76 is mainly configured to obtain an input operation of a user, and the input device 76 may vary with the terminal. For example, when the terminal is a PC, the input device 76 may be an input device 76 such as a mouse or a keyboard; when the terminal is portable device such as a smartphone or a tablet computer, the input device 76 may be a touchscreen.

In this embodiment, a computer storage medium is stored in the memory 73, a computer executable instruction is stored in the computer storage medium, and the computer executable instruction is configured to perform the information processing method in the embodiments of the present technology.

In the several embodiments provided in this application, it should be understood that the disclosed device and method may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present technology may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a portable storage device, a read-only memory (ROM), a random access memory (RAM), a magnetic disk, or an optical disc.

Alternatively, in the present disclosure, when the integrated unit is implemented in a form of a software functional module and sold or used as an independent product, the integrated unit may be stored in a computer-readable storage medium. Based on such an understanding, the technical solutions of the embodiments of the present technology essentially, or the part contributing to the existing technology may be implemented in a form of a software product. The computer software product is stored in a storage medium, and includes several instructions for instructing a computer device (which may be a personal computer, a server, or a network device) to perform all or some of the operations of the methods described in the embodiments of the present technology. The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

In the embodiments of the present technology, by means of a window location in a character container object deployed in a character selection area in a GUI, rendering is performed, in a corresponding window location, on a character operation object associated with a second character object that performs information exchange with a first character object, and rendering is performed, according to a first display parameter, on a character operation object associated with a second character object whose distance to the first character object meets a first preset condition, that is, rendering is performed, according to the first display parameter, on a UI avatar associated with the second character object whose distance to the first character object meets a first preset condition, so that the UI avatar has a display effect that is different from that of another UI avatar, and when a user selects a target character operation object, it is convenient for the user to rapidly and accurately select a target character object based on the different display effect by means of a selection operation gesture on the character operation object, thereby greatly improving operation experience of the user in an interaction process.

What is claimed is:

1. A method, comprising:
at a first gaming terminal, wherein the first gaming terminal corresponds to a first game player in a group game, and wherein the first gaming terminal comprises one or more processors and memory:
displaying a first game scene from a first viewing perspective corresponding to the first game player in the game, wherein the first game scene includes a plurality of game characters with which the first game player is configured to interact with in the game;
displaying, concurrently with the first game scene, a character selection area that is distinct from the first game scene, including displaying, within the character selection area, a plurality of avatars corresponding to a first subset of the plurality of game characters, wherein the plurality of avatars represent teammates of the first game player in the group game, the first subset of the plurality of game characters are currently within a threshold range of a first game operation associated with the first game player, and wherein the first subset of the plurality of game characters are dynamically adjusted in accordance with respective current locations of the plurality of game characters relative to the first game player in the game;
displaying, on each of the plurality of avatars, a respective visual cue that indicates status attribute information of enemy characters adjacent to a teammate corresponding to the avatar in the game, wherein the status attribute information represents a blood value between the enemy characters and the teammate;
detecting a selection input directed to a first avatar of the plurality of avatars whose visual cue represents a highest blood value in the character selection area, the first avatar corresponding to a second game player that is one of the teammates of the first game player in the game; and
in response to detecting the selection input directed to the first avatar, retrieving and displaying a second game scene from a second viewing perspective corresponding to the second game player, further including:
determining a predefined enemy status for enemy characters within the second game scene from the viewing perspective of the second game player; and
displaying a respective indicator object in association with the respective avatar of the second game character, wherein the respective indicator object indicates a summary of the predefined enemy status for enemy characters within the second game scene from the viewing perspective of the second game player and wherein the summary of the predefined enemy status includes a plurality of: a total amount of enemy life remaining, total enemy ammunition, a total enemy count, within an attack range of a respective game character for which the summary is being determined.

2. The method of claim 1, wherein displaying the character selection area further includes:
displaying, within the character selection area, respective avatars corresponding to a second subset of the plurality of game characters that are currently not eligible targets of the first game operation associated with the first game player, wherein the avatars of the first subset of the plurality of game characters are visually distinguished from the avatars of the second subset of the plurality of game characters in the character selection area based on a first visual effect applied to the avatars of only one of the first or second subset of game characters.

3. The method of claim 2, including:
while concurrently displaying the first game scene and the character selection area, detecting changes in the game characters displayed within the first game scene, wherein the changes in the game characters cause at least one game character in the first subset of the plurality of game characters to become an ineligible target for the first game operation associated with the first game player; and
in response to detecting the changes in the game characters within the first game scene, updating the character selection area, including changing a visual appearance of the avatar corresponding to the at least one game character to reflect that the at least one game character is no longer in the first subset of the plurality of game characters and is now in the second subset of the plurality of game characters.

4. The method of claim 3, wherein the changes in the game characters include at least one of:
the at least one game character has exited a target range of the first game operation associated with the first game player, and
the at least one game character has changed status and become immune to the first game operation associated with the first game player.

5. The method of claim 1, including:
   determining the predefined enemy status for a subset of the enemy characters that are within both the first game scene and the second game scene; and
   displaying an adjustment to the respective indicator object that indicates a summary of the predefined enemy status for the subset of the enemy characters that are within both the first game scene and the second game scene.

6. An electronic device, comprising:
   one or more processors; and
   memory, wherein:
      the electronic device serves as a first gaming terminal, the first gaming terminal corresponds to a first game player in a group game, and the memory stores instructions, which, when executed by the one or more processors, cause the processors to perform operations comprising:
         displaying a first game scene from a first viewing perspective corresponding to the first game player in the game, wherein the first game scene includes a plurality of game characters with which the first game player is configured to interact with in the game;
         displaying, concurrently with the first game scene, a character selection area that is distinct from the first game scene, including displaying, within the character selection area, a plurality of avatars corresponding to a first subset of the plurality of game characters, wherein the plurality of avatars represent teammates of the first game player in the group game, the first subset of the plurality of game characters are currently within a threshold range of a first game operation associated with the first game player, and wherein the first subset of the plurality of game characters are dynamically adjusted in accordance with respective current locations of the plurality of game characters relative to the first game player in the game;
         displaying, on each of the plurality of avatars, a respective visual cue that indicates status attribute information of enemy characters adjacent to a teammate corresponding to the avatar in the game, wherein the status attribute information represents a blood value between the enemy characters and the teammate;
         detecting a selection input directed to a first avatar of the plurality of avatars whose visual cue represents a highest blood value in the character selection area, the first avatar corresponding to a second game player that is one of the teammates of the first game player in the game; and
         in response to detecting the selection input directed to the first avatar, retrieving and displaying a second game scene from a second viewing perspective corresponding to the second game player, including:
            determining a predefined enemy status for enemy characters within the second game scene from the viewing perspective of the second game player; and
            displaying a respective indicator object in association with the respective avatar of the second game character, wherein the respective indicator object indicates a summary of the predefined enemy status for enemy characters within the second game scene from the viewing perspective of the second game player and wherein the summary of the predefined enemy status includes a plurality of: a total amount of enemy life remaining, total enemy ammunition, a total enemy count, within an attack range of a respective game character for which the summary is being determined.

7. The device of claim 6, wherein displaying the character selection area further includes:
   displaying, within the character selection area, respective avatars corresponding to a second subset of the plurality of game characters that are currently not eligible targets of the first game operation associated with the first game player, wherein the avatars of the first subset of the plurality of game characters are visually distinguished from the avatars of the second subset of the plurality of game characters in the character selection area based on a first visual effect applied to the avatars of only one of the first or second subset of game characters.

8. The device of claim 7, wherein the operations include:
   while concurrently displaying the first game scene and the character selection area, detecting changes in the game characters displayed within the first game scene, wherein the changes in the game characters cause at least one game character in the first subset of the plurality of game characters to become an ineligible target for the first game operation associated with the first game player; and
   in response to detecting the changes in the game characters within the first game scene, updating the character selection area, including changing a visual appearance of the avatar corresponding to the at least one game character to reflect that the at least one game character is no longer in the first subset of the plurality of game characters and is now in the second subset of the plurality of game characters.

9. The device of claim 8, wherein the changes in the game characters include at least one of:
   the at least one game character has exited a target range of the first game operation associated with the first game player, and
   the at least one game character has changed status and become immune to the first game operation associated with the first game player.

10. The device of claim 6, wherein the operations include:
   determining the predefined enemy status for a subset of the enemy characters that are within both the first game scene and the second game scene; and
   displaying an adjustment to the respective indicator object that indicates a summary of the predefined enemy status for the subset of the enemy characters that are within both the first game scene and the second game scene.

11. A non-transitory computer-readable storage medium having instructions stored thereon, the instructions, when executed by one or more processors, cause the processors to perform operations comprising:
   at a first gaming terminal, the first gaming terminal corresponds to a first game player in a group game:
      displaying a first game scene from a first viewing perspective corresponding to the first game player in the game, wherein the first game scene includes a plurality of game characters with which the first game player is configured to interact with in the game;
      displaying, concurrently with the first game scene, a character selection area that is distinct from the first game scene, including displaying, within the character selection area, a plurality of avatars corresponding to a first subset of the plurality of game characters, wherein the plurality of avatars represent teammates of the first game player in the group game, the first subset of the plurality of game characters are currently within a threshold range of a first game operation associated with the first game player, and wherein the first subset of the plurality of game characters are dynamically adjusted in accordance with respective current locations of the plurality of game characters relative to the first game player in the game;

displaying, on each of the plurality of avatars, a respective visual cue that indicates status attribute information of enemy characters adjacent to a teammate corresponding to the avatar in the game, wherein the status attribute information represents a blood value between the enemy characters and the teammate;

detecting a selection input directed to a first avatar of the plurality of avatars whose visual cue represents a highest blood value in the character selection area, the first avatar corresponding to a second game player that is one of the teammates of the first game player in the game; and in response to detecting the selection input directed to the first avatar, retrieving and displaying a second game scene from a second viewing perspective corresponding to the second game player, including:

determining a predefined enemy status for enemy characters within the second game scene from the viewing perspective of the second game player; and displaying a respective indicator object in association with the respective avatar of the second game character, wherein the respective indicator object indicates a summary of the predefined enemy status for enemy characters within the second game scene from the viewing perspective of the second game player and wherein the summary of the predefined enemy status includes a plurality of: a total amount of enemy life remaining, total enemy ammunition, a total enemy count, within an attack range of a respective game character for which the summary is being determined.

12. The non-transitory computer-readable storage medium of claim 11, wherein displaying the character selection area further includes:

displaying, within the character selection area, respective avatars corresponding to a second subset of the plurality of game characters that are currently not eligible targets of the first game operation associated with the first game player, wherein the avatars of the first subset of the plurality of game characters are visually distinguished from the avatars of the second subset of the plurality of game characters in the character selection area based on a first visual effect applied to the avatars of only one of the first or second subset of game characters.

13. The non-transitory computer-readable storage medium of claim 12, wherein the operations include:

while concurrently displaying the first game scene and the character selection area, detecting changes in the game characters displayed within the first game scene, wherein the changes in the game characters cause at least one game character in the first subset of the plurality of game characters to become an ineligible target for the first game operation associated with the first game player; and in response to detecting the changes in the game characters within the first game scene, updating the character selection area, including changing a visual appearance of the avatar corresponding to the at least one game character to reflect that the at least one game character is no longer in the first subset of the plurality of game characters and is now in the second subset of the plurality of game characters.

14. The non-transitory computer-readable storage medium of claim 13, wherein the changes in the game characters include at least one of:

the at least one game character has exited a target range of the first game operation associated with the first game player, and the at least one game character has changed status and become immune to the first game operation associated with the first game player.

15. The non-transitory computer-readable storage medium of claim 11, wherein the operations include:

determining the predefined enemy status for a subset of the enemy characters that are within both the first game scene and the second game scene; and displaying an adjustment to the respective indicator object that indicates a summary of the predefined enemy status for the subset of the enemy characters that are within both the first game scene and the second game scene.

* * * * *